United States Patent
Suwa

(10) Patent No.: US 8,300,576 B2
(45) Date of Patent: Oct. 30, 2012

(54) RADIO COMMUNICATION APPARATUS

(75) Inventor: Yutaka Suwa, Fukuoka (JP)

(73) Assignee: Panasonic Corporation, Osaka (JP)

( * ) Notice: Subject to any disclaimer, the term of this patent is extended or adjusted under 35 U.S.C. 154(b) by 388 days.

(21) Appl. No.: 12/033,979

(22) Filed: Feb. 20, 2008

(65) Prior Publication Data

US 2008/0146271 A1 Jun. 19, 2008

Related U.S. Application Data

(63) Continuation of application No. 10/238,814, filed on Sep. 9, 2002, now Pat. No. 7,372,827.

(30) Foreign Application Priority Data

Sep. 7, 2001 (JP) .................................. 2001-271324
Nov. 16, 2001 (JP) .................................. 2001-351458

(51) Int. Cl.
*H04W 4/00* (2009.01)

(52) U.S. Cl. ........ 370/328; 370/337; 370/345; 370/465; 370/338

(58) Field of Classification Search .................. 370/328, 370/337, 345, 347, 349, 350, 465, 466, 338, 370/470

See application file for complete search history.

(56) References Cited

U.S. PATENT DOCUMENTS

| | | | |
|---|---|---|---|
| 5,077,732 A | 12/1991 | Fischer et al. | |
| 5,748,676 A | 5/1998 | Mahany | |
| 6,016,430 A | 1/2000 | Shinomiya | |
| 6,167,285 A * | 12/2000 | Howe | 455/552.1 |
| 6,223,030 B1 | 4/2001 | Van Den Heuvel et al. | |
| 6,297,737 B1 * | 10/2001 | Irvin | 340/571 |
| 6,370,369 B1 | 4/2002 | Kraiem et al. | |
| 6,477,152 B1 * | 11/2002 | Hiett | 370/316 |
| 6,477,156 B1 | 11/2002 | Ala-Laurila et al. | |
| 6,484,027 B1 * | 11/2002 | Mauney et al. | 455/421 |
| 6,717,926 B1 | 4/2004 | Deboille et al. | |
| 6,829,288 B2 | 12/2004 | Orava | |

(Continued)

FOREIGN PATENT DOCUMENTS

JP 06-104827 4/1994

(Continued)

OTHER PUBLICATIONS

Supplementary European Search Report for EP 02 76 7917, dated Aug. 3, 2006.

(Continued)

*Primary Examiner* — Kibrom T Hailu
(74) *Attorney, Agent, or Firm* — RatnerPrestia

(57) ABSTRACT

A base unit of a radio communication apparatus of the present invention includes a controller that discriminates whether or not company identifying information transmitted from a cordless handset is specific information in connecting a line in a Bluetooth (BT) communication mode, performs communication in another radio communication standard (company's own mode) on determining that the company identifying information is the specific information, and performs the communication in a BT standard on determining that the company identifying information is not the specific information, and a registering unit for registering an ID peculiar to the apparatus. This simple structure allows long-distance communication at higher sound quality with the other apparatus capable of performing CDL communication in the company's own mode using an error handling function, and sound communication at usual sound quality in a BT data format allowing short-distance communication even when the company identifying information is not the specific information.

9 Claims, 15 Drawing Sheets

U.S. PATENT DOCUMENTS

| | | |
|---|---|---|
| 6,895,255 B1 | 5/2005 | Bridgelall |
| 6,901,241 B2 * | 5/2005 | Bjorndahl ................. 455/41.2 |
| 6,941,156 B2 * | 9/2005 | Mooney ................. 455/553.1 |
| 6,973,071 B1 * | 12/2005 | Bourk ......................... 370/349 |
| 7,046,649 B2 * | 5/2006 | Awater et al. ............. 370/338 |
| 7,095,749 B1 * | 8/2006 | van der Tuijn ............ 370/412 |
| 7,110,392 B1 | 9/2006 | Fujii et al. |
| 7,200,130 B2 * | 4/2007 | Forstadius et al. ......... 370/338 |
| 2001/0031637 A1 * | 10/2001 | Suzuki ....................... 455/435 |
| 2002/0075941 A1 | 6/2002 | Souissi et al. |

FOREIGN PATENT DOCUMENTS

| | | |
|---|---|---|
| JP | 06-112892 | 4/1994 |
| JP | 07-123043 | 5/1995 |
| JP | 09-187071 | 7/1997 |
| JP | 09-507986 | 8/1997 |
| JP | 09-261746 | 10/1997 |
| JP | 09-294104 | 11/1997 |
| JP | 10-243461 | 9/1998 |
| JP | 11-008879 | 1/1999 |
| JP | 11-041163 | 2/1999 |
| JP | 11-136736 | 5/1999 |
| JP | 2000-165929 | 6/2000 |
| JP | 2001-025069 A | 1/2001 |
| JP | 2001-078244 | 3/2001 |
| JP | 2001-144827 | 5/2001 |
| JP | 2002-101166 | 4/2002 |
| WO | WO 97/09835 | 3/1997 |
| WO | WO 99/41876 | 8/1999 |
| WO | WO 00/32002 | 6/2000 |
| WO | WO 01/01633 | 1/2001 |

OTHER PUBLICATIONS

International (Japanese) search report for PCT/JP02/09113 dated Dec. 12, 2002.

* cited by examiner

FIG. 5A BT(HV3)
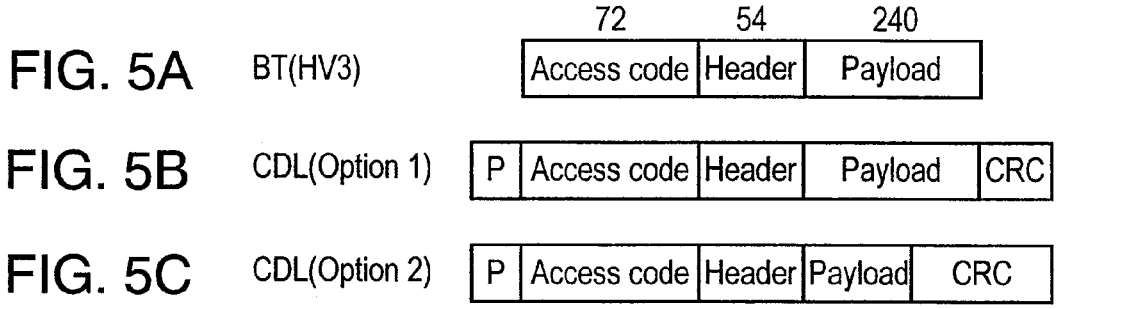
FIG. 5B CDL(Option 1)
FIG. 5C CDL(Option 2)
FIG. 6A
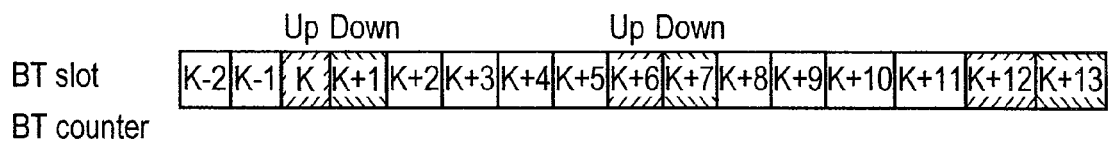
FIG. 6B
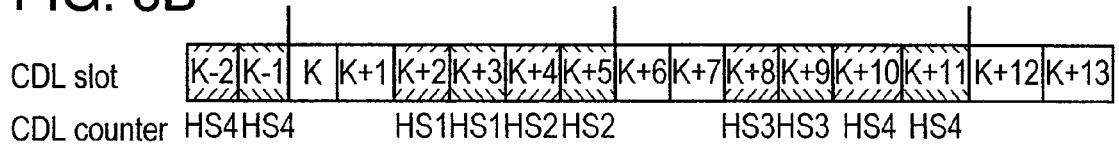
FIG. 7A
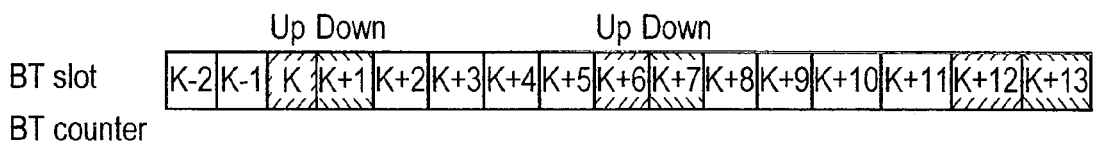
FIG. 7B
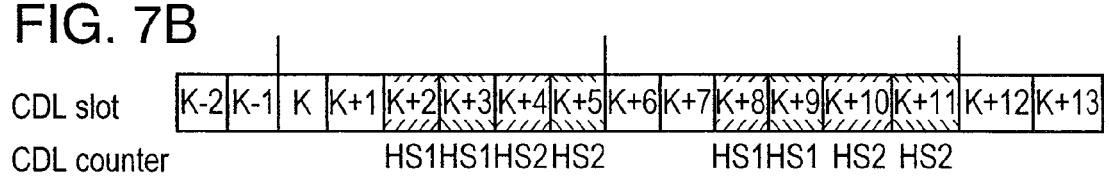

BT(DH1)

CDL(Option 3)

BT slot
BT counter

CDL slot
CDL counter

RADIO COMMUNICATION APPARATUS

This application is a continuation of U.S. patent application Ser. No. 10/238,814, filed Sep. 9, 2002, the entire disclosure of which is incorporated herein by reference.

FIELD OF THE INVENTION

The present invention relates to a radio communication apparatus for transmitting, receiving, or processing radio signals in data formats of a plurality of radio communication standards.

BACKGROUND OF THE INVENTION

An apparatus having a wireless part instead of a wire part has recently become widespread. For example, a personal computer is connected to a printer by radio. An apparatus employing a radio communication standard called Bluetooth (BT) as a time division multiple access (TDMA) standard has become widespread. Bluetooth is defined by a standardization group called the Bluetooth Special Interest Group (Bluetooth SIG). Bluetooth is normalized for the purpose of interconnecting a notebook-sized personal computer, a personal digital assistant (PDA), and a cellular phone without using a cable to communicate sound or data.

The BT standard, which is a unified standard, employs the same signal format independently of a manufacturer of the apparatus. In other words, the signal format is not flexible and thus improvement of communication quality and communication distance are largely restricted.

Therefore, a radio communication apparatus is also developed which has both a Bluetooth system and a telephone system, and includes a cellular phone or a telephone set of a company's own cordless phone standard that additionally has a Bluetooth standard communication function. A Bluetooth radio unit (BT radio unit) and a cordless phone unit (CDL radio unit) are individually disposed for responding to radio signals with different standards in the prior art. This structure, however, leads to the enlargement of the apparatus and the cost increase.

DISCLOSURE OF THE INVENTION

A radio communication apparatus of the present invention transmits, receives, or processes signals in data formats of a plurality of radio communication standards. The radio communication apparatus starts communication firstly in a first radio communication standard, and, on receiving a connection request from another radio apparatus, discriminates whether or not company identifying information transmitted from the radio apparatus is specific information. When the transmitted company identifying information is the specific information, the radio communication apparatus switches the first radio communication standard to a second radio communication standard and communicates signals. When the transmitted company identifying information is not the specific information, the radio communication apparatus continues to communicate the signals in the first radio communication standard. A company stands for a manufacturer of a radio communication apparatus hereinafter.

When the radio communication apparatus registers another radio apparatus on the other end of the line, unique identification numbers (IDs peculiar to the apparatuses) are shown to each other, and the identification numbers are registered. During the communication, the radio communication apparatus determines switching to the second radio communication standard or keeping the first radio communication standard, based on whether or not the registered ID is a specific ID.

BRIEF DESCRIPTION OF THE DRAWINGS

FIG. 5A is a format diagram of Bluetooth (BT) data in accordance with the exemplary embodiment 1.

FIG. 5B is a format diagram of option 1 of data formats of a cordless phone (CDL) in accordance with the exemplary embodiment 1.

FIG. 5C is a format diagram of option 2 of the data formats of the CDL in accordance with the exemplary embodiment 1.

FIG. 6A is a time slot diagram of a data format of a BT mode in accordance with the exemplary embodiment 1.

FIG. 6B is a time slot diagram of option 1 of data formats in a CDL mode in accordance with the exemplary embodiment 1.

FIG. 7A is a time slot diagram of a data format in the BT mode in accordance with the exemplary embodiment 1.

FIG. 7B is a time slot diagram of option 2 of the data formats in the CDL mode in accordance with the exemplary embodiment 1.

DETAILED DESCRIPTION OF THE PREFERRED EMBODIMENT

Embodiments of the present invention will be described hereinafter with reference to the accompanying drawings.

Exemplary Embodiment 1

Figure 1:
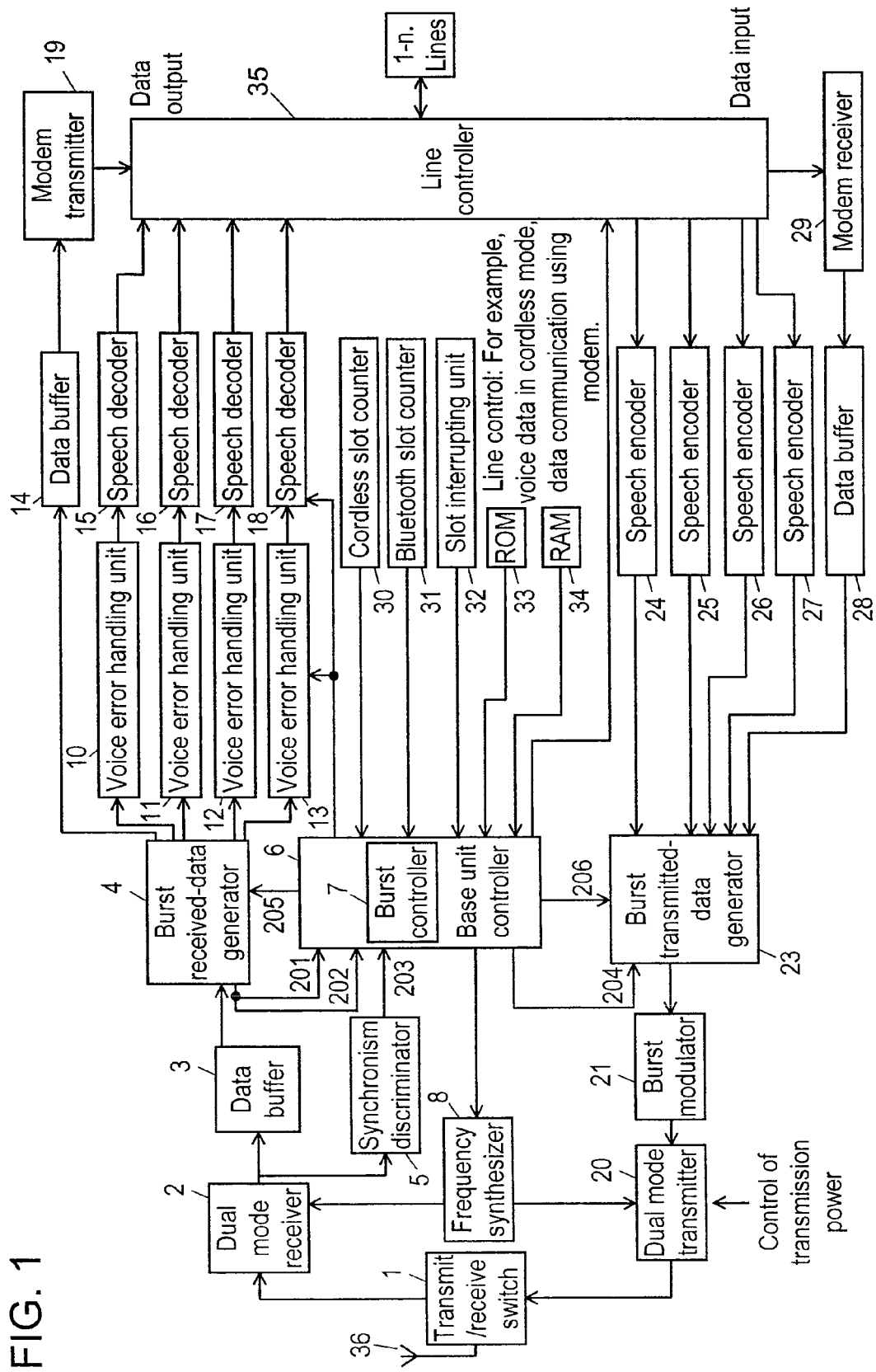
FIG. 1 is a block diagram of a base unit of a radio communication apparatus in accordance with an exemplary embodiment 1 of the present invention.
Figure 2:
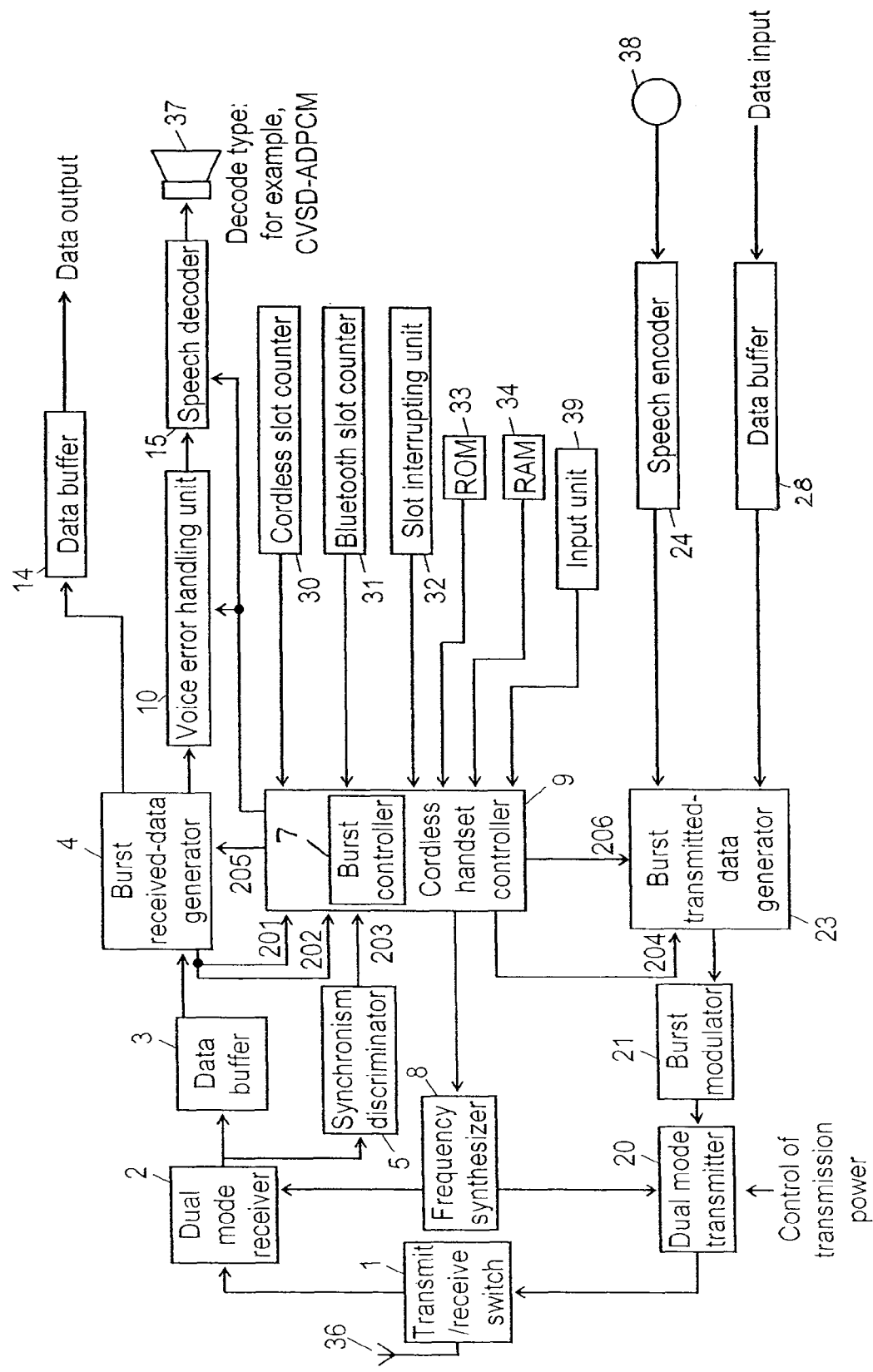
FIG. 2 is a block diagram of a cordless handset of the radio communication apparatus in accordance with the exemplary embodiment 1.

FIG. 1 and FIG. 2 are respective block diagrams of a base unit and a cordless handset constituting a cordless phone in accordance with exemplary embodiment 1 of the present invention.

In FIG. 1 and FIG. 2, transmit/receive switch 1 switches a signal route between a transmitting state and a receiving state. Dual mode receiver 2 receives signals in dual modes (a mode corresponding to the Bluetooth (BT) standard and a mode corresponding to a company's own cordless phone standard). Data buffers 3, 14, and 28 buffer data.

Synchronism discriminator 5 determines whether or not a value in the Access Code of received data matches with a value (Syncword) set in an internal register of a built-in correlator (not shown). For example, when the cordless handset requests a line connection, base unit controller 7 sets a Syncword in the internal register of the correlator. Here, the Syncword is generated from a BT device address of the base unit. When Syncword extracted from the Access Code of the received data matches with the value set in the internal register, synchronism discriminator 5 informs the base unit controller 6 that the received data is packet data with receiving timing of the base unit.

The Access Code comprises a Preamble, a Syncword, and a Trailer. The Preamble and the Trailer have a fixed bit pattern, and the Syncword depends on an address (BT device address) of a master device.

The BT device address comprises a company-by-company code (Company-ID) and a number assigned to each apparatus by each company. They correspond to, for example, a vender identifier and a serial number of a Media Access Control (MAC) address. Upper bits of the BT device address indicate a number set for each company, and lower bits indicate a number individually assigned by each company. A predetermined group manages the assignment of the company-by-company code in the upper bits, and assigns a number in response to an application from a company.

Burst controller 7 included in base unit controller 6 for controlling an entire base unit, in communicating with the cordless handset, determines a communication mode based on the BT device address of the cordless handset shown from the cordless handset. Specifically, burst controller 7 determines whether or not the cordless handset has specific company identifying information (vender identifier or Company ID), thereby discriminating a communication mode, namely whether the communication is performed in a cordless (CDL) mode or a Bluetooth (BT) mode. When the communication is performed in the CDL mode, burst controller 7 determines a preferable communication type (a data format, a slot structure, a power level, and a channel option). For determining whether or not the cordless handset belongs to a specific company (same as a manufacturer of the base unit), the following steps are executed. RAM 34 previously stores Company IDs and BT device addresses of cordless handsets in relation to each other. A cordless handset firstly informs the base unit of the BT device address of the cordless handset. The base unit then extracts the Company ID from random access memory (RAM) 34 corresponding to the BT device address informed from the cordless handset. The Company ID is compared with the specific Company ID. RAM 34 stores the BT device addresses of the cordless handsets and communication types (a data format, a slot structure, a power level, and a channel option) in relation to each other. Burst controller 7 takes the communication type corresponding to the BT device address shown from the cordless handset, thereby determining which data format, slot structure, power level, and channel option should be selected.

Based on version information of the cordless handset received in registering the cordless handset, the base unit controller selects the optimal communication type supported by the cordless handset and the base unit. The BT device address of the cordless handset is related to the communication type. The version information is stored in RAM 34 as number information (version number) such as Version 1.01 for clarifying a supported function. Even in the similar radio communication apparatuses, a supported function can often be added and the performance can be improved depending on the manufacturing date or updating of the program. When a function is added, the version number is updated. The version information comprises three kinds of version information: version information of equipment's hardware, version information of equipment's software, and version information of the Bluetooth itself. These are transmitted as a single unit to the other end of the line during communication.

When the version of the cordless handset is V1.01 and that of the base unit is V1.20, a communication type may be selected from functions supported in V1.01. The communication type can be selected by setting by a user of the cordless handset or the base unit. In this case, the cordless handset or the base unit having the communication type selected by the user sends the selected type to the counter unit, and communication is performed in the communication type.

The base unit controller 6 may monitor the traffic and radio field intensity, and determine a communication type so as to dynamically vary error correcting depth or the number of simultaneous communications between the base unit and the cordless handset.

Burst controller 7 informs burst received-data generator 4 of mode select signal 205 indicating a mode to be selected. When the communication mode is the cordless mode, burst controller 7 also informs the generator of the communication type such as the data format. Burst received data generator 4 divides the received data in a format of the mode informed from base unit controller 6, of the dual modes.

Sound error handling units 10 to 13 process sound based on an attenuator level and a filter level that are shown from burst controller 7 through burst received-data generator 4. Speech decoders 15 to 18 decode received sound signals. Modem transmitter 19 transmits the signals through a modem.

Dual mode transmitter 20 transmits the signals in dual modes while controlling electric power. Burst modulator 21 performs burst modulation. Burst transmitted-data generator 23 generates a packet to be transmitted in response to the format of the mode indicated from burst controller 7. Speech encoders 24 to 27 encode sound signals to be transmitted. Modem receiver 29 receives signals through a modem.

Cordless slot counter 30 counts clocks for discriminating a time position of a slot in the CDL mode. Cordless slot counter 30 outputs a count value when the notification from synchronism discriminator 5 indicates a CDL signal. Bluetooth slot counter 31 counts clocks for discriminating a time position of a slot in the BT mode. Bluetooth slot counter 31 outputs a count value when the notification from synchronism discriminator 5 indicates a BT signal. Slot interrupting unit 32 commands slot interruption. Read-only memory (ROM) 33 and random-access memory (RAM) 34 store data for the base unit controller. Line controller 35 controls a line for connection with the outside. Antenna 36 communicates data with a cordless handset.

Transmit/receive switch 1, dual mode receiver 2, frequency synthesizer 8, and dual mode transmitter 20 constitute a radio unit. Elements other than the radio unit, ROM 33, RAM 34, and line controller 35 can be integrated as a base band integrated circuit (IC). A plurality of elements in the circuit block may be integrated into one element.

FIG. 2 is a block diagram of the cordless handset of the radio communication apparatus. A structure in FIG. 2 differs from the structure in FIG. 1 in that the structure in FIG. 2 comprises cordless handset controller 9 for controlling the entire cordless handset, one sound error handling unit 10 for processing sound, and one speech encoder 24 for encoding a sound signal. Speech decoder 15 decodes a received sound signals. Additionally, instead of modem transmitter 19 and modem receiver 29, speaker 37 and microphone 38 are disposed as interfaces with a speaking person. A basic structure of the cordless handset is almost similar to that of the base unit.

Operations in the base unit are briefly described with reference to FIG. 1. Data coming through antenna 36 is sent to dual mode receiver 2 via transmit/receive switch 1 and received by the receiver. The data received by dual mode receiver 2 in response to the present mode is fed into burst received-data generator 4 through data buffer 3. Synchronism discriminator 5 receives the received data from dual mode receiver 2, determines whether or not the Access Code of the received data matches with a value set in an internal register of a built-in correlator. Synchronism discriminator 5 informs burst controller 7 in base unit controller 6 of the determination result (whether or not it is access to the self). When the notification indicates the access to the self, burst controller 7 commands burst received-data generator 4 to perform communication in the BT mode. Burst received-data generator 4 divides the received data in the format of the BT mode shown from burst controller 7, and reads the contents of the received data. Burst controller 7 then determines a communication mode based on the BT device address of the cordless handset shown from the cordless handset. Burst controller 7, on determining communication in the cordless mode, commands burst received-data generator 4 to perform communication in the cordless mode after a predetermined communication procedure, for example, after connecting a communication channel.

Burst controller 7 stores following two data into RAM 34:
(A) a present count value (clock number) of cordless slot counter 30 or BT slot counter 31; and
(B) mode information indicating the CDL mode or the BT mode.

When mode select signal 205 from synchronism discriminator 5 indicates that the received data is BT data, for example, a count value of BT slot counter 31 and the information indicating the BT mode are stored in RAM 34.

Based on the count value and the mode information stored in RAM 34, burst controller 7 performs a synchronization discriminating process for discriminating whether or not the received slot is truly assigned to the terminal (the base unit or the cordless handset) in compliance with the CDL standard or the BT standard. In other words, burst controller 7 calculates receiving timing based on the count values of cordless slot counter 30 and BT slot counter 31, and outputs a burst signal indicating a self receive/transmit slot based on the mode information, CDL or BT.

Date formats of Bluetooth (BT) and cordless phone (CDL) are described hereinafter. FIG. 5A is a format diagram of BT data format. In FIG. 5A, BT data comprises Access Code, Header, and Payload.

FIG. 5B and FIG. 5C are format diagrams of option 1 and option 2 of data formats of the CDL, respectively. Length of the Payload of the slot format in option 2 shown in FIG. 5C is a half of that in option 1 (FIG. 5B). Both options 1 and 2 have Cyclic Redundancy Check (CRC) data. The error detection of the Payload is performed but the error correction is not performed in the CRC data of option 1 (FIG. 5B), and both the error detection and error correction of the Payload are performed in the CRC data of option 2 (FIG. 5C). When increase of simultaneous traffics is more desired than securement of speech quality, the communication is performed in option 1. When the securement of the speech quality is more desired than the increase of the simultaneous traffics, the communication is performed in option 2. Thus, selection in response to the situation is allowed.

As discussed above, essentially, until connecting a communication channel with the cordless handset, burst received-data generator 4 divides the received data in the data format in FIG. 5A based on the notification from burst controller 7 and reads the contents of the received data. After connecting the communication channel, if the communication with the cordless handset is in the CDL mode, burst received-data generator 4 divides the received data in the data format in FIG. 5B or FIG. 5C and reads the contents of the received data. If the communication with the cordless handset is in the BT mode, the generator divides the received data in the data format in FIG. 5A and reads the contents of the received data.

In FIG. 5A, FIG. 5B and FIG. 5C, the Access Code has the same format, so that the Access Code can be received in any data format independently of the mode. Therefore, data from every cordless handset that lies in a radio zone of the base unit and transmits data in the data format in FIG. 5C can be also received.

In the CDL mode, radio control data 201 is used for connection and synchronization. In the BT mode, also, message exchange during connecting and synchronizing is realized by receiving data 201 from burst received-data generator 4 and analyzing the contents of the data.

Now, operations of burst received-data generator 4 are described. Based on mode select signal 205 from burst controller 7, a mode of burst received-data generator 4 is set as discussed above. Burst received-data generator 4, when a received packet is in the CDL mode, takes data in each of the fields shown in FIG. 5B and FIG. 5C from the received data with an adequate timing. When the received packet is in the BT mode, the generator takes data in each of the Access Code, Header, and Payload fields (FIG. 5A) with an adequate timing.

Burst received-data generator 4 sends radio control data 201 and radio quality data 202 to base unit controller 6.

Burst received-data generator 4 sends radio quality data 202 to inform burst controller 7 of the presence or absence of errors and an error ratio in the Access Code and Header (FIG. 5A) in the Bluetooth (BT) mode, or to inform burst controller 7 of the presence or absence of errors and an error ratio in the Access Code, Header, and Payload (FIG. 5B and FIG. 5C) in the cordless (CDL) mode. Burst controller 7 sets a mode in burst received-data generator 4 in response to mode select signal 205.

Radio quality data 202 indicates quality of a received pulse and strength of a received electric field. For example, Preamble (P field in FIG. 5B and FIG. 5C) of the CDL data includes Eye data of the received pulse generated during receiving and the strength of the received electric field at that time. The quality of the received pulse shows how a duty ratio of the pulse is close to 50%, and is used for exchanging antenna diversity or reception gain. This function cannot be used in the BT standard, because the Preamble has only four 4 bits. When a terminal on the other end of the line is determined to be a product of the company based on the BT address exchanged in connection, however, both modes on the transmitting and receiving sides are switched to the company's own mode. In the own mode, the number of bits in the Preamble is increased. Thus, the quality of the received pulse and the strength of the received electric field are discriminated, and the antenna diversity or reception gain is switched similarly to the cordless phone.

Burst controller 7 also performs discrimination by weighting based on an error item shown by radio quality data 202 in sound error handlings at different times. Burst controller 7 informs sound error handling units 10 to 13 of an attenuator level or a filter level.

Sound error handling units 10 to 13 process the sound data based on the information from burst controller 7. In other words, sound error handling units 10 to 13 attenuate or filter pulse code modulation (PCM) sound data fed every slot. This process compensates a sound signal lost by an error and reduces noise that can be generated by the error.

Sound error handling units 10 to 13 always check for spike noise by monitoring a sound state. Sound error handling units 10 to 13, on detecting the spike noise, control atenuance of the attenuator and a characteristic of the filter. The received data from burst received-data generator 4 is supplied to a line through data buffer 14, modem transmitter 19, and line controller 35. Speech decoders 15 to 18 decode the received data (sound data) processed by sound error handling units 10 to 13, and output the received data as sound data from line controller 35.

Now, operations of transmitting sound supplied through a line from the base unit to the cordless handset are described. The sound signals through the line is fed from line controller 35 of the base unit into speech encoders 24 to 27, encoded in the encoders, and supplied as sound data to burst transmitted-data generator 23. In other words, the sound data is fed into burst transmitted-data generator 23 through line controller 35, modem receiver 29, and data buffer 28. Burst controller 7 discriminates whether a transmitted slot is a CDL slot or a BT slot, based on data stored in RAM 34 and count data of cordless slot counter 30 and Bluetooth slot counter 31. Burst controller 7 informs burst transmitted-data generator 23 of a mode via mode select signal 206.

Burst transmitted-data generator 23 receives radio control data 204, generates packet data including the sound data to be transmitted in response to the format of the informed mode, and then outputs the packet data to dual mode transmitter 20 through burst modulator 21. Base unit controller 6 controls transmission power of dual mode transmitter 20 in response to the mode. The packet data supplied from dual mode transmitter 20 is emitted as radio wave signals from antenna 36 to the air through transmit/receive switch 1. The radio wave signals are received by the cordless handset of FIG. 2, for example.

A maximum value of the transmission power of dual mode transmitter 20 is preferably 100 mW in the BT mode, or 1000 mW (when the number of using radio channels is 75 or more) or 125 mW (when the number of using radio channels is less than 75) in the CDL mode.

Now, operations of the cordless handset are briefly described with reference to FIG. 2. Data received by dual mode receiver 2 through transmit/receive switch 1 in response to a mode is fed into burst received-data generator 4 through data buffer 3. Burst received-data generator 4 divides the received data in the format of the mode informed from burst controller 7, and reads the contents of the received data. Synchronism discriminator 5 receives the received data from dual mode receiver 2, and discriminates whether or not the destination of the received data is the self based on Access Code of the received data. Discrimination or the like of the data formats and modes of the Bluetooth (BT) and cordless phone (CDL) is the same as that of the base unit.

Burst controller 7 sets a mode in burst received-data generator 4 based on mode select signal 205. Burst received-data generator 4 outputs radio control data 201 and radio quality data 202 to cordless handset controller 9. Radio control data 201 and radio quality data 202 are the same as those of the base unit. Operations of burst received-data generator 4, burst controller 7, and sound error handling unit 10 are the same as those of the base unit.

Sound error handling unit 10 processes sound data based on notification from burst controller 7. Sound error handling unit 10 always checks for spike noise, and, on detecting spike noise, controls attenuance of the attenuator and a characteristic of the filter. The received data fed from burst received-data generator 4 is output through data buffer 14 to a universal serial bus (USB) of a personal computer or the like. Speech decoder 15 decodes the received data (sound data) processed by sound error handling unit 10, and outputs the received data as sound signals to speaker 37.

Now, transmission from the cordless handset is described. Sound signals from microphone 38 are encoded in speech encoders 24, and supplied as sound data to burst transmitted-data generator 23. Data input from the personal computer or the like through the USB is supplied to burst transmitted-data generator 23 through data buffer 28. Burst controller 7 discriminates whether the input data must be transmitted through the CDL slot or the BT slot based on data stored in RAM 34 and count data, similarly to the transmitting operation of the base unit discussed above. Burst controller 7 supplies mode select signal 206 to burst transmitted-data generator 23 to inform the generator of the discriminated mode. Burst transmitted-data generator 23 receives radio control data 204, generates packet data to be transmitted in response to the format of the informed mode, and then outputs the packet data to dual mode transmitter 20 through burst modulator 21. Cordless handset controller 9 controls transmission power of dual mode transmitter 20 in response to the mode. The packet data supplied from dual mode transmitter 20 is emitted as radio wave signals from antenna 36 to the air through transmit/receive switch 1. The radio wave signals are received by the base unit of FIG. 1, for example.

Figure 3:
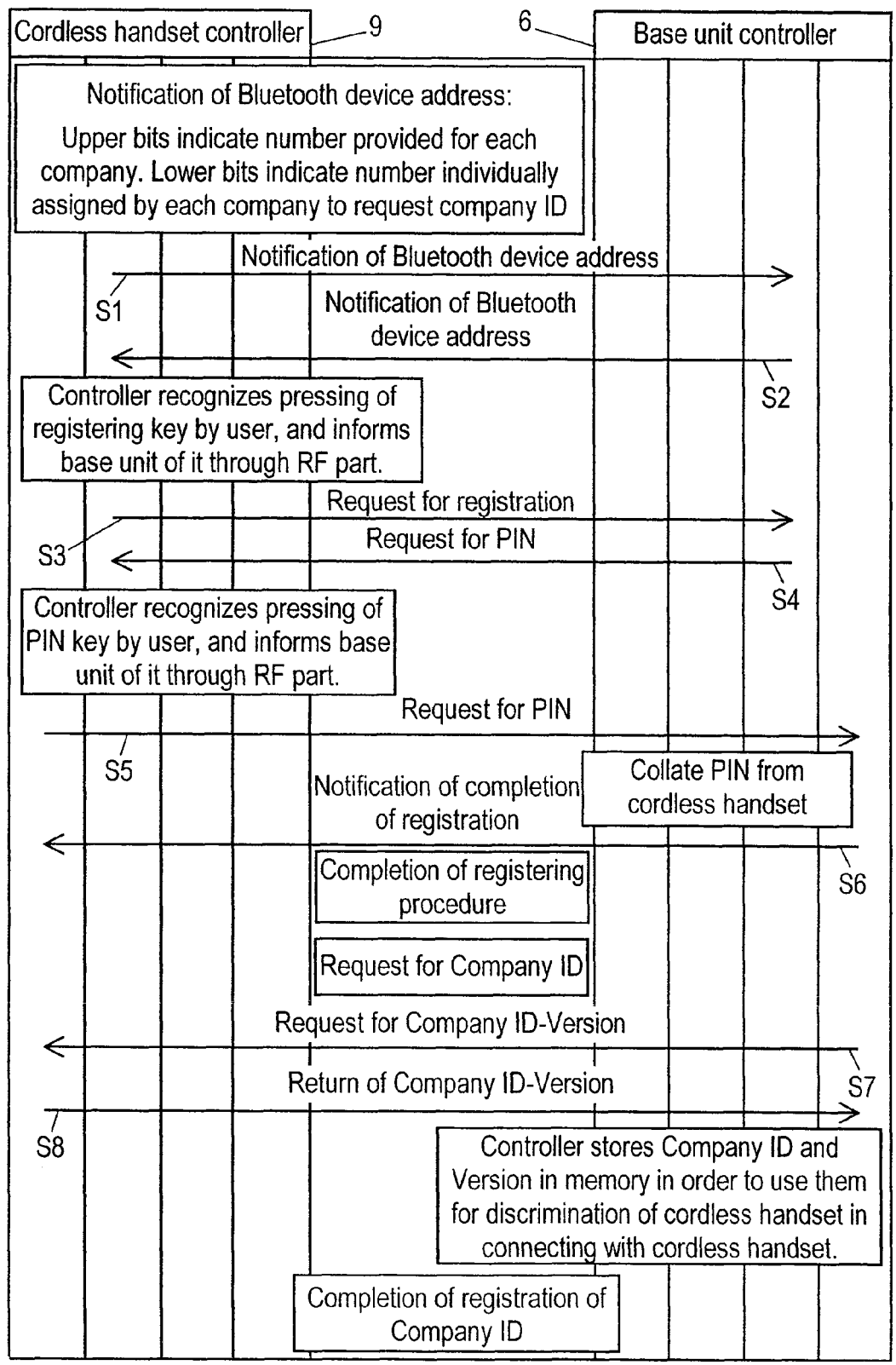
FIG. 3 is a sequence diagram showing a sequence operation between a base unit controller and a cordless handset controller in registering the cordless handset in accordance with the exemplary embodiment 1.
Figure 4:
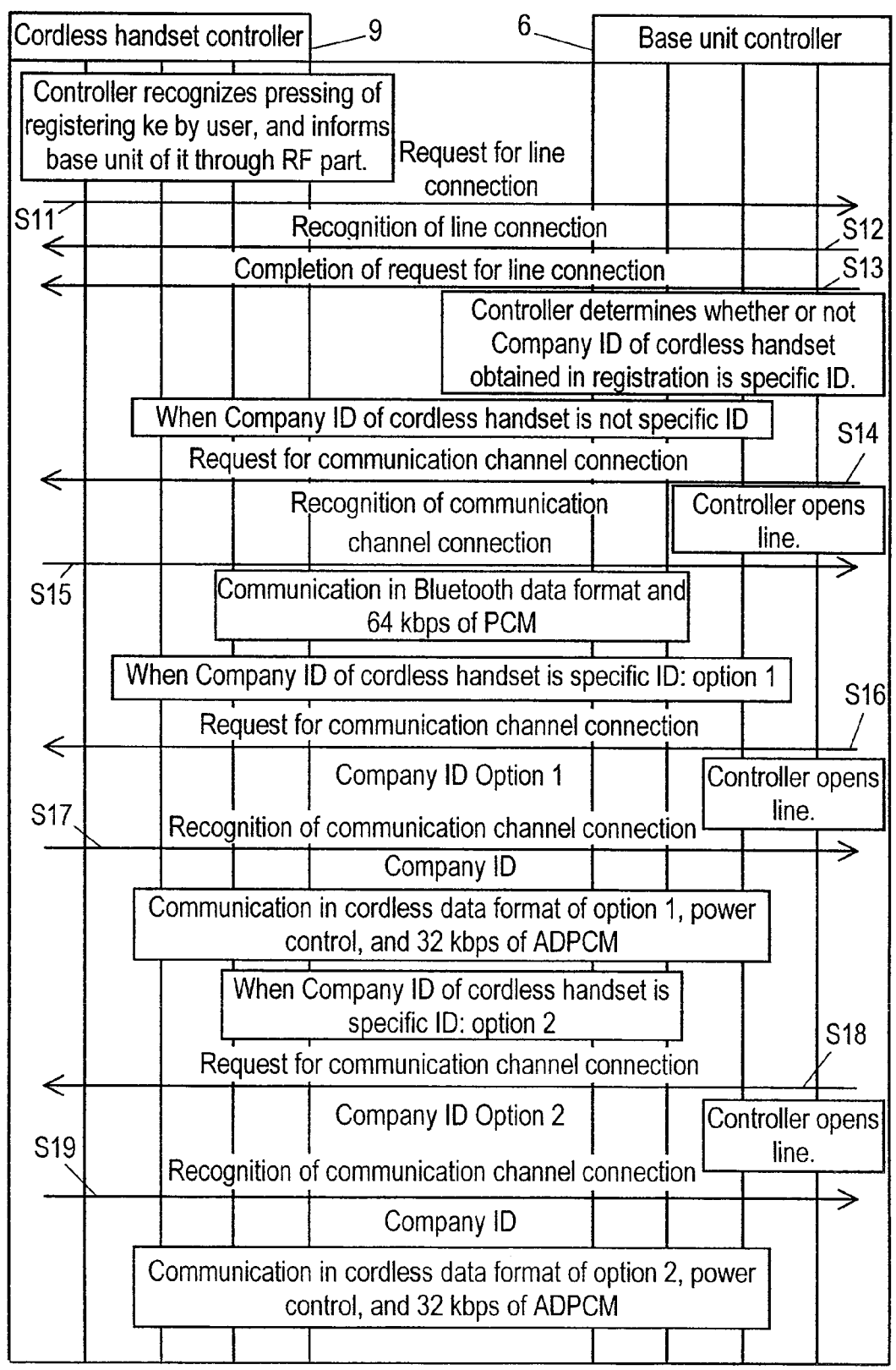
FIG. 4 is a sequence diagram showing a sequence operation between the base unit controller and the cordless handset controller in connecting a line in accordance with the exemplary embodiment 1.

Now, sequence operations between base unit controller 6 and cordless handset controller 9 are described in detail with reference to FIG. 3 to FIG. 7. FIG. 3 is a sequence diagram showing a sequence operation between base unit controller 6 and cordless handset controller 9 in registering the cordless handset. FIG. 4 is a sequence diagram showing a sequence operation between base unit controller 6 and cordless handset controller 9 in connecting a communication channel. In registering the cordless handset in FIG. 3, the communication is performed in the BT data format. In connecting the communication channel in FIG. 4, the communication is performed in the BT data format at least from a first request for the line connection to the completion of the request for the line connection.

A procedure of registering the cordless handset is firstly described with reference to FIG. 3. Before the registering request from the cordless handset, the cordless handset and the base unit inform each other of respective unique identification numbers (peculiar IDs) previously and peculiarly assigned to the cordless handset and the base unit using a data region (payload, FIG. 5A). In FIG. 3, they informs each other of BT device addresses as the identification numbers (S1, S2). Each BT device address comprises a number provided for each company (vender identifier) and a number (serial number) independently assigned to each company's own radio device. The BT device addresses may be used as company identifying information.

Cordless handset controller 9, on detecting a pressed state of a registering key (not shown) of input unit 39, requests registration of the base unit (S3). Base unit controller 6, on receiving the registering request, requests a personal identification number (PIN) of the cordless handset (S4). Cordless handset controller 9, on receiving the request for the PIN, informs the base unit of the PIN (S5). The base unit now finishes the registration of the cordless handset, and then base unit controller 6 informs the cordless handset of the completion of the registration (S6). The PIN is a number predetermined by the base unit. When the cordless handset sends the same PIN as that registered in the base unit in response to the PIN request from the base unit, the communication request from the cordless handset is authorized. After that, the registered cordless handset can communicate with the base unit. A connecting request from a cordless handset that has not been registered in the base unit is rejected.

Next, base unit controller 6 requests a Company ID and a version number of the cordless handset (S7). Cordless handset controller 9, on receiving the request, returns a Company ID and a version number previously stored in the cordless handset to the base unit (S8). The base unit registers the Company ID and the version number together with the BT device address. The base unit now finishes the registration of the Company ID of the cordless handset.

A Company ID is a peculiar ID assigned to each applicant by a standard administrating group or the like and is used as a company identifying information for identifying a company. In FIG. 3, a Company ID assigned by a Bluetooth (BT) administrating group is used. The Company ID includes a specific Company ID (for example, the same as a Company ID of the base unit) and a non-specific Company ID, and respective Company IDs are stored in corresponding memory regions (for example, a first memory region and a second memory region).

Since the cordless handset and the base unit inform each other of respective unique identification numbers (peculiar IDs) and store the counter identification numbers before registering the Company ID as discussed above, the Company ID and the version number can be registered together with the peculiar ID on the other end of the line in relation to each other. The version number includes a software version and/or a hardware version. In requesting a PIN, the notification of a peculiar ID (BT device address) on the other end of the line may be requested. The peculiar ID on the other end of the line may be requested instead of the PIN.

The BT device address comprises a number (vender identifier) provided for each company and a number (serial number) individually assigned by each company. The number provided for each company and the Company ID can belong to different companies or can belong to the same company. After the completion of steps S1 and S2, the vender identifier of the BT device address makes clear whether or not the vender identifier and the Company ID belong to the same company. When both of them belong to the same company, it can be recognized only by the vender identifier that the base unit and the cordless handset belong to the same company. Therefore, the number provided for each company in the BT device address shown in steps S1 and S2 may be used as the Company ID. In this case, the request and the reply of the Company ID are omitted in steps S7 and S8, and only version information is requested and returned.

Now, a procedure of connecting a line is described with reference to FIG. 4 to FIG. 7B.

A user of the cordless handset, in starting communication, presses a speaking key (not shown) of input unit 39. Cordless handset controller 9, on detecting the pressing of the speaking key, communicates with the base unit in the BT data format, and requests line connection of the base unit (S11). The BT device address of the cordless handset is also informed in step S11. Base unit controller 6, on receiving the request for the line connection, starts a line connecting process. After the completion of the line connection, base unit controller 6 transmits recognition data of the line connection to the cordless handset (S12), and informs the cordless handset of the completion of the line connection (S13).

Next, base unit controller 6 determines whether or not the Company ID obtained in registering the cordless handset that has requested for the line connection is a specific ID. In other words, base unit controller 6 determines whether or not the Company ID stored in RAM 34 in relation to the BT device address (it is included in Payload) of the cordless handset is the specific ID. This BT device address has been shown to the base unit in requesting the line connection.

(A) When base unit controller 6 determines that the Company ID is not the specific ID, the controller requests connection of a communication channel in the BT data format (64 kbs of PCM) (S14). The cordless handset returns the recognition of the communication channel connection to the base unit (S15), and finishes the line connection.

(B) When base unit controller 6 determines that the Company ID is the specific ID, the controller determines whether a set data format of the CDL data formats is that of option 1 or option 2. This determination is performed by taking the communication type corresponding to the BT device address of the cordless handset out of RAM 34. Here, the BT device address has been shown from the cordless handset. When the communication type is selected based on setting by the user of the cordless handset, the cordless handset informs the base unit of the communication type. The informed communication type takes priority, and this type of communication is performed.

(1) In option 1, base unit controller 6 requests the connection of the communication channel in the same data format (64 kbs of PCM) as that in the BT mode (S16). The cordless handset returns the recognition of the communication channel connection to the base unit in the CDL data format (32 kbs of adaptive differential pulse code modulation (ADPCM)) of option 1 shown in FIG. 5B (S17), and finishes the line connection. The communication is performed in the data format of option 1 until opening the communication channel.

(2) In option 2, base unit controller 6 requests the connection of the communication channel in the same data format (64 kbs of PCM) as that in the BT mode (S18). The cordless handset returns the recognition of the communication channel connection to the base unit in the CDL data format (32 kbs of ADPCM) of option 2 shown in FIG. 5C (S19), and finishes the line connection. The communication is performed in the data format of option 2 until opening the communication channel. Both error detection and error correction of the Payload are performed using CRC in option 2, so that speech quality of option 2 is higher than that of option 1. The Company ID is used as the company identifying information in the case discussed above; however, upper bits of the BT device address may be used as the company identifying information. In the latter case, base unit controller 6 determines whether or not the ID of the cordless handset is the specific ID based on the upper bits of the shown BT device address.

In FIG. 4, power control is also performed in option 1 or option 2. The power control depends on a channel option. As the channel option, channel option 1 or channel option 2 is selected. In channel option 1, of 79 communication channels, 75 channels are used for the communication and 4 channels are used as spare channels. In channel option 2, of 79 communication channels, less than 75 channels are used for the communication (for example, 15 channels are used for the communication and 64 channels are used as spare channels). Frequency Hopping Spectrum Spread (FH-SS) mode is used in the radio communication apparatus of the present embodiment. It can be determined as a channel option whether the number of hopping frequencies is set for less than 75 channels or for 75 channels. A cordless communication standard or the like in the 2.4 G band defines that an average of transmission power of radio signals for a certain time in one frequency band is a predetermined value or lower. The average can be kept low if many channels hop, so that the transmission power of the radio signals in one channel can be increased.

In channel option 1, the power is set at 1000 mW to allow long-distance communication. In channel option 2, the power is set at 125 mW, slightly higher than 100 mW in the BT mode. Respective time slots for communication in channel options 1 and 2 are different from each other, as discussed below.

FIG. 6A illustrates a time slot structure showing assignment of time slots in the Bluetooth (BT) mode. FIG. 6B illustrates a time slot structure showing assignment of time slots of option 1 in the cordless phone (CDL) mode. FIG. 7A also illustrates a time slot structure showing assignment of time slots in the Bluetooth (BT) mode. FIG. 7B illustrates a time slot structure showing assignment of time slots of option 2 in the CDL mode. In FIG. 6A, FIG. 6B, FIG. 7A, and FIG. 7B, downward-sloping diagonal lines indicate Down (communication from the base unit to the cordless handset). FIG. 6A and FIG. 7A indicate communication to one cordless handset, and indicate each of transmission and reception every six slots.

As shown in FIG. 6B, four cordless handsets (HS) can be registered and used in option 1. When the base unit has six speech decoders or the like, simultaneous calls between six cordless handsets (HS) at the maximum and the base unit are allowed. In option 1, each of transmission and reception is performed every 12 slots in 32 kbs of ADPCM.

FIG. 7B shows a time slot structure in option 2, and a case having two HSs. In option 2, signals are transmitted or received in 32 kbs of ADPCM, but the length of the Payload in the slot format is a half of that in option 1 as shown in FIG. 5B and FIG. 5C. Each of transmission and reception is performed every six slots in option 2, so that simultaneous three radio communications at the maximum are allowed.

The data formats in options 1 and 2 have CRC data as shown in FIG. 5B and FIG. 5C. The error detection of the Payload is performed but the error correction of it is not performed in option 1, and both error detection and error correction of the Payload are performed at CRC in option 2. Therefore, the speech quality in option 2 can be improved comparing with option 1.

The base unit can communicate with a plurality of cordless handsets as long as communications do not overlap at the same slot position. For example, the base unit can simultaneously communicate with four cordless handsets in option 1 and another cordless handset in option 2. Communications at the same slot position required in the present embodiment may disadvantageously cause interference. Additionally, the base unit has only one transmitter and only one receiver. Therefore, base unit controller 7 prevents the communication requiring duplication of the slots.

Figure 8:
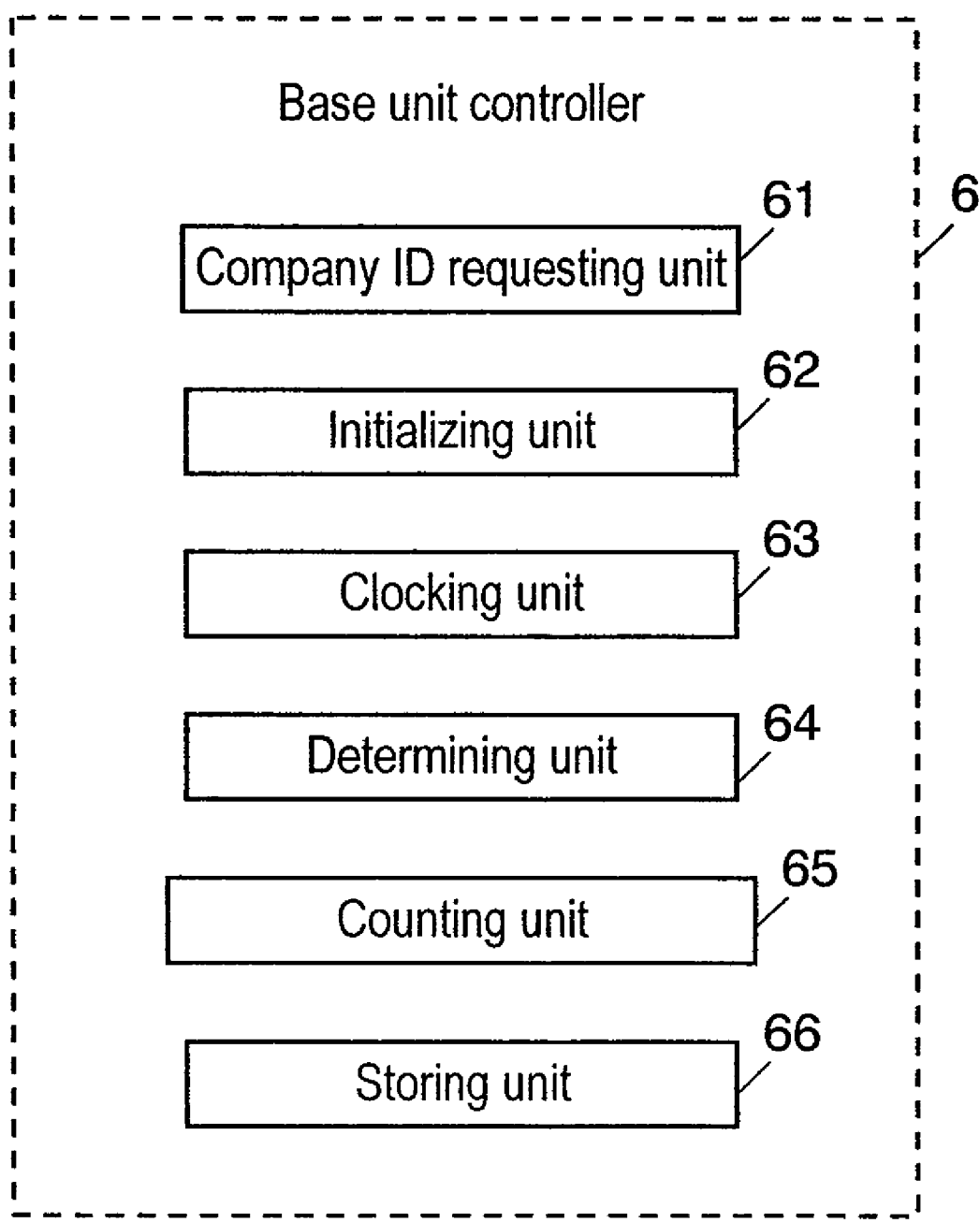
FIG. 8 is a function block diagram of function realizing units in the base unit controller in accordance with the exemplary embodiment 1.
Figure 9:
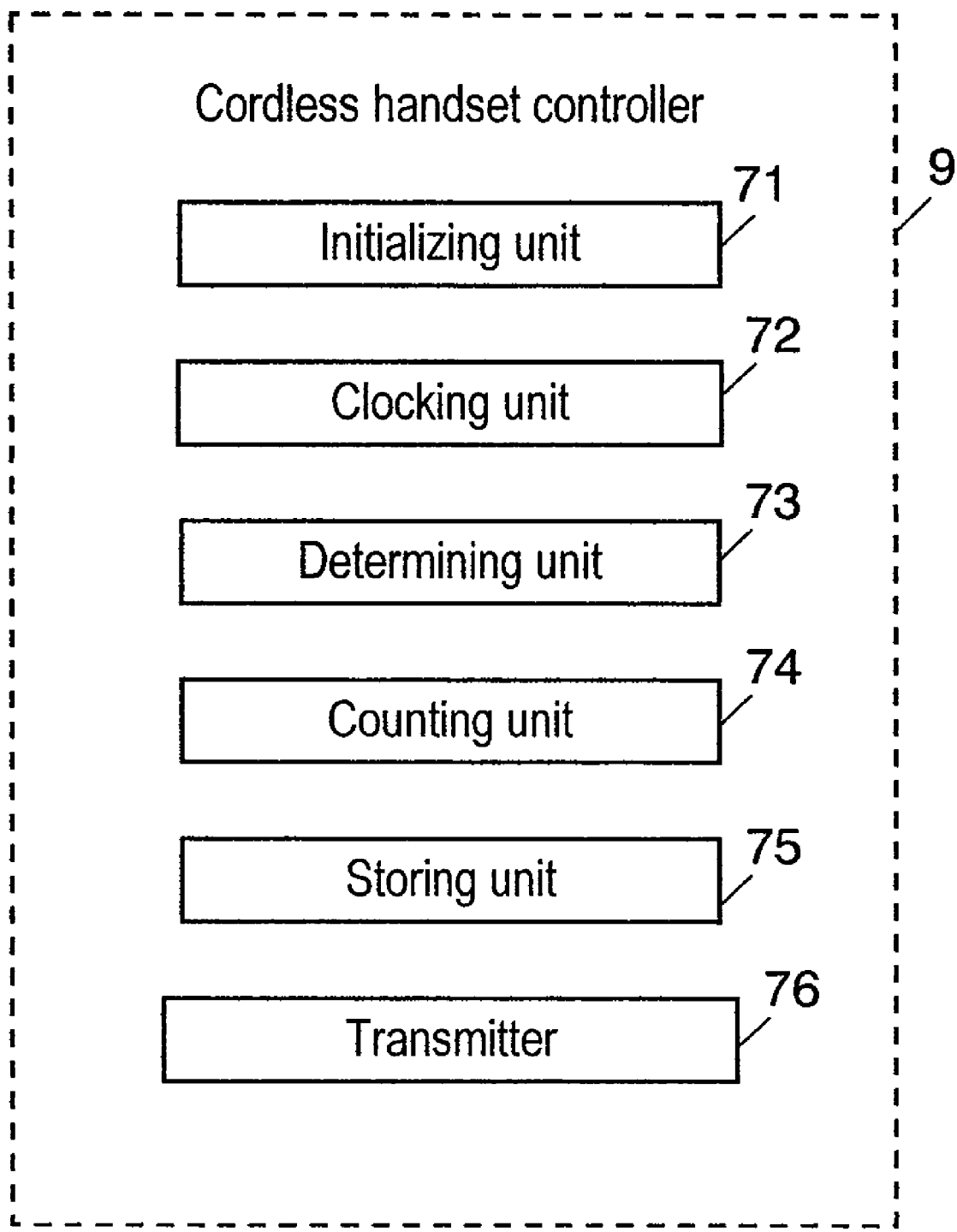
FIG. 9 is a function block diagram of function realizing units in the cordless handset controller in accordance with the exemplary embodiment 1.

FIG. 8 and FIG. 9 are function block diagrams of function realizing units in base unit controller 6 and cordless handset controller 9, respectively. In FIG. 8, base unit controller 6 comprises the following function realizing units:

Company ID requesting unit 61 for requesting a Company ID of the cordless handset;

initializing unit 62 for initializing the base unit;

clocking unit 63 for measuring time;

determining unit 64 that determines the presence or absence of a reply from the cordless handset, and, on determining the presence, determines whether or not the Company ID of the cordless handset is a specific ID;

counting unit 65 for counting the number of repeatings or the like; and storing unit 66 for storing the Company ID of the cordless handset and the version number of the Company ID of the cordless handset in a first base unit memory region (not shown) when the Company ID is the specific ID, and storing the Company ID of the cordless handset and the version number of the Company ID of the cordless handset in a second base unit memory region (not shown) when the Company ID is not the specific ID.

In FIG. 9, cordless handset controller 9 comprises the following function realizing units:

initializing unit 71 for initializing the cordless handset;

clocking unit 72 for measuring time;

determining unit 73 that determines the presence or absence of a request for the Company ID from the base unit, and, on determining the presence, determines whether or not the requested Company ID is the specific ID;

counting unit 74 for counting the number of repeatings or the like;

storing unit 75 for storing the Company ID of the cordless handset and the version number of the Company ID of the cordless handset in a first cordless handset memory region (not shown) when the Company ID is the specific ID, and storing the Company ID of the cordless handset and the version number of the Company ID of the cordless handset in a second cordless handset memory region (not shown) when the Company ID is not the specific ID; and transmitter 76 for transmitting the Company ID of the cordless handset and the version number of the Company ID of the cordless handset to the base unit.

Procedures of registering the Company IDs in the base unit and the cordless handset are described with reference to FIG. 10 and FIG. 11.

Figure 10:
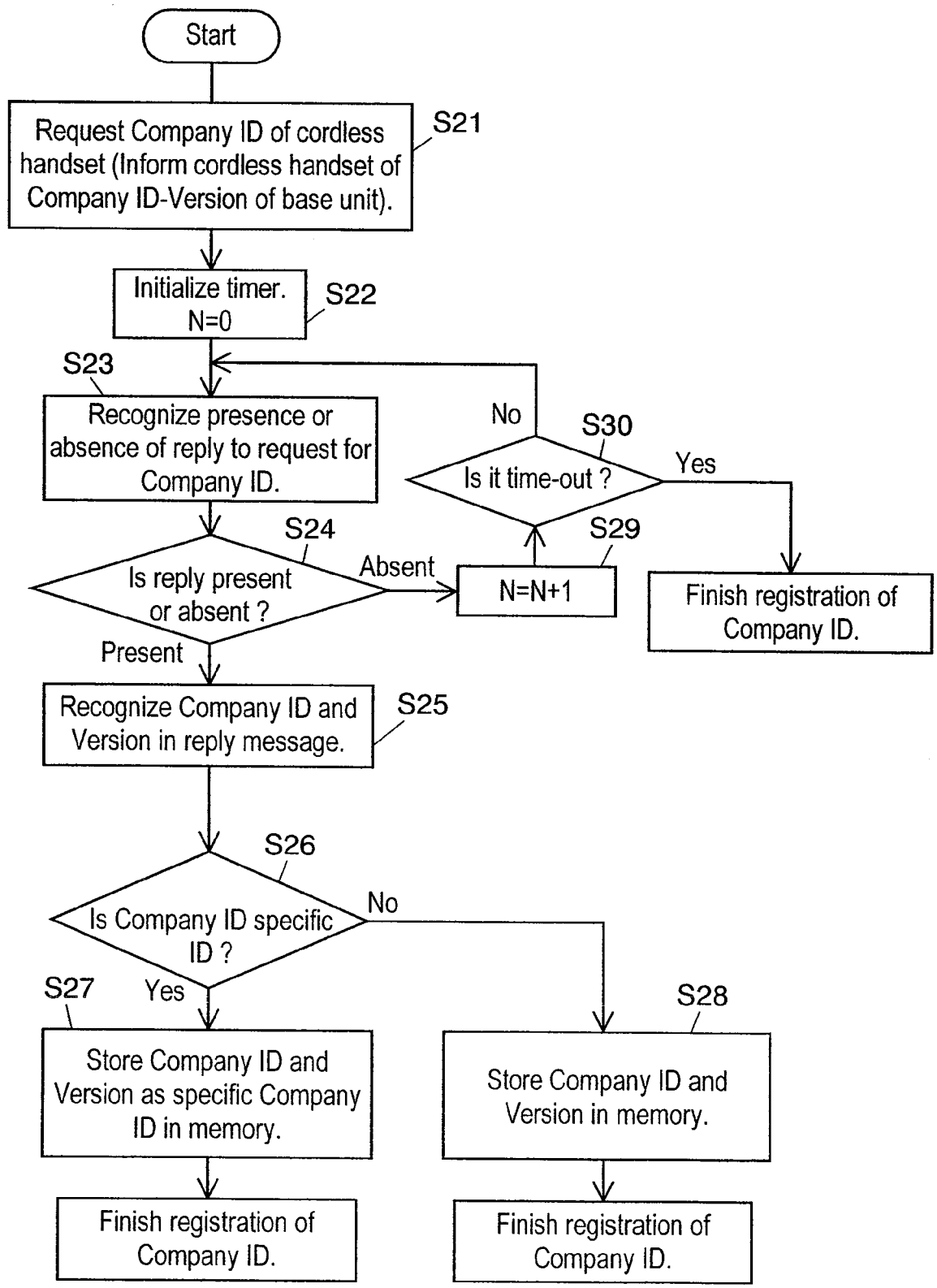
FIG. 10 is a flow chart of a Company ID registering procedure in the base unit in accordance with the exemplary embodiment 1.

The procedure of registering the Company ID in the base unit is firstly described using the flow chart in FIG. 10. Company ID requesting unit 61 of the base unit requests the Company ID of the cordless handset (S21). At this time, Company ID requesting unit 61 also informs the cordless handset of the Company ID and the version number of the base unit. Initializing unit 62 initializes a timer of clocking unit 63, and sets the number N for calculating a time-out at zero (S22).

Determining unit 64 determines the presence or absence of a reply from the cordless handset (S23, S24). On determining the presence, determining unit 64 determines whether or not the Company ID in a reply message is a specific ID (S25, S26).

When the Company ID is the specific ID in step S26, storing unit 66 recognizes the specific Company ID (company's own mode) and stores the Company ID together with the version number in the first memory region (not shown) (S27). When the specific ID is not detected in step S26, storing unit 66 simply stores the Company ID and the version number in the second memory region (not shown) (S28).

When the absence of the reply is determined in step S24, counting unit 65 increments the number N by one in order to recognize the presence or absence of a reply in the next receiving slot. Clocking unit 63 determines the time-out or not (S30). This registering procedure returns to step S23 when the time-out is not determined, and finishes this registering procedure when the time-out is determined.

Figure 11:
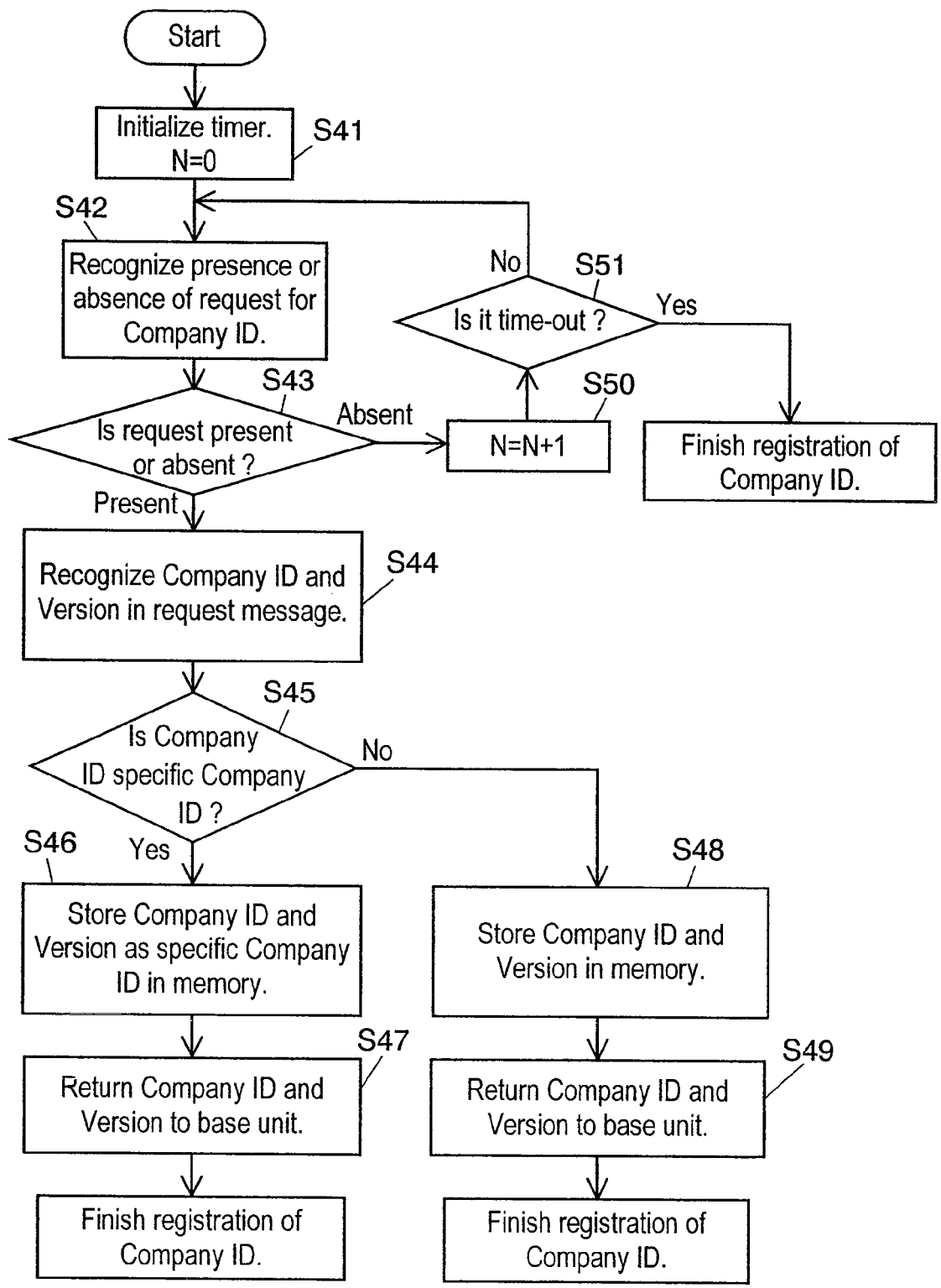
FIG. 11 is a flow chart of a Company ID registering procedure in the cordless handset in accordance with the exemplary embodiment 1.

The procedure of registering the Company ID in the cordless handset is then described using the flow chart in FIG. 11.

Initializing unit 71 initializes a timer of clocking unit 72, and sets the number N at zero (S41). Determining unit 73 determines the presence or absence of a request from the base unit (S42, S43). On determining the presence, determining unit 73 determines whether or not the Company ID (cordless handset's own Company ID) corresponding to a request message is a specific ID (S44, S45).

When the Company ID is the specific ID in step S45, storing unit 75 recognizes the specific Company ID and stores the Company ID together with the version number in the first memory region (S46). Then, transmitter 76 transmits the Company ID and the version number to the base unit (S47). When the specific ID is not detected in step S45, storing unit 75 stores the Company ID and the version number in the second memory region (S48). Then, transmitter 76 transmits the Company ID and the version number to the base unit (S49). When the absence of the request is determined in Step 43, counting unit 74 increments the number N by one. Counting unit 74 determines the time-out or not (S51). This registering procedure returns to step S42 when the time-out is not determined, and finishes when the time-out is determined.

The Company ID is required in the present embodiment; however, only a request for the version information may be performed using, as the Company ID, a number (vender identifier) provided for each company in the upper bits of the BT device address shown in the communication procedure in registering the cordless handset.

In the present embodiment, as discussed above, in registering a counter radio apparatus on the other end of the line, base unit controller 6 registers a Company ID transmitted from the counter radio apparatus in RAM 34 in relation to an ID peculiar to the radio apparatus. In starting the communication, base unit controller 6 switches a radio communication mode used afterward depending on whether or not the Company ID of the counter radio apparatus is a specific ID. In other words, base unit controller 6 selects a radio signal (for example, data format) to be communicated depending on the Company ID. For example, base unit controller 6 selects a radio signal corresponding to the CDL when the Company ID is the specific ID, or a radio signal corresponding to the BT when the Company ID is not the specific ID. Thus, base unit controller 6 selects the radio communication signal depending on a situation.

Base unit controller 6 performs a synchronization process in a first radio communication standard (for example, BT). In connecting a communication channel with a counter communication apparatus, the communication is continued in the first radio communication standard when the Company ID of the registered counter communication apparatus is not the specific ID. When the Company ID of the registered counter communication apparatus is the specific ID, the communication is performed in a second radio communication standard (company's own CDL mode). Thus, when the Company ID of the counter radio communication apparatus is the specific ID, for example, the CDL communication can be performed in a data format structured so as to improve sound quality and allow long-distance communication. When the Company ID of the counter radio communication apparatus is not the specific ID, the communication is continued in the first radio communication standard (for example, BT) having usual sound quality and allowing short-distance communication. Thus, the communication having quality corresponding to the Company ID of the counter radio communication apparatus is allowed.

The second radio communication standard has a first data format including error detecting data used for only error detection of the Payload and a second data format including error detecting data used for error detection and error correction of the Payload. Base unit controller 6 can select either of them. In other words, the second radio communication standard (for example, a company's own CDL data format) is selected when the Company ID of the counter radio communication apparatus is the specific ID, and further the first data format or the second data format can be selected. The communication having sound quality corresponding to the Company ID of the counter radio communication apparatus is thus allowed, and communication having a different condition such as the sound quality, speech distance, and the number of simultaneous communications can be selected by a user or the like.

Base unit controller 6 can set the transmission power to be higher than that in the communication in the first radio communication standard, by selecting any of a plurality of channel options in the second radio communication standard. The communication having sound quality and distance corresponding to the Company ID of the counter radio communication apparatus is thus allowed.

Base unit controller 6 comprises the following function realizing units:

Company ID requesting unit 61 for requesting a Company ID of a counter communication apparatus;

determining unit 64 that determines the presence or absence of a reply from the counter communication apparatus, and, on determining the presence, determines whether or not the Company ID of the counter communication apparatus is a specific ID; and storing unit 66 for storing the Company ID of the counter communication apparatus and the version number of the counter communication apparatus in a first memory region when the Company ID is the specific ID, and storing the Company ID of the counter communication apparatus and the version number of the counter communication apparatus in a second memory region when the Company ID is not the specific ID.

The base unit certainly performs the communication having the sound quality corresponding to the Company ID of the counter radio communication apparatus thanks of the structure discussed above.

When the base unit has a BT communication function as well as the company's own CDL communication function, the base unit usually communicates signal because the first radio communication standard is the BT data format. After connecting the communication channel, the BT data format is switched to the CDL communication function in response to the Company ID of the counter radio communication apparatus. Therefore, the own CDL mode communication having a sound quality as high as possible can be obtained.

A plurality of data formats are prepared in the CDL mode. In one of the data formats, data length of the Payload is set equal to that of the Payload in the first radio communication standard, and the slot interval is set twice as long as that in the first radio communication standard. The base unit can therefore simultaneously communicate with radio communication apparatuses twice as many as those in the first radio communication standard. In other words, when this data format in the CDL mode is used, the base unit can therefore simultaneously communicate with six radio communication apparatuses, namely twice as many as those in the BT communication.

In another CDL data format, data length of the Payload is a half of that of the Payload in the first radio communication standard, and the slot interval is the same as that in the first radio communication standard. Information such as error detection data can be added differently from the communication in the first radio communication standard, and speech quality can be improved.

Exemplary Embodiment 2

Structures of a base unit and a cordless handset in accordance with an exemplary embodiment 2 of the present invention are similar to those of exemplary embodiment 1 shown in FIG. 1 and FIG. 2. Exemplary embodiment 2 has a function of data communication added to exemplary embodiment 1. In exemplary embodiment 1 a communication format is changed based on the Company ID, but in exemplary embodiment 2 the format is changed based on a peculiar ID (Bluetooth (BT) device address). A structure in which the communication format is changed based on the Company ID similarly to exemplary embodiment 1 is also in the scope of the present invention.

Figure 12A:
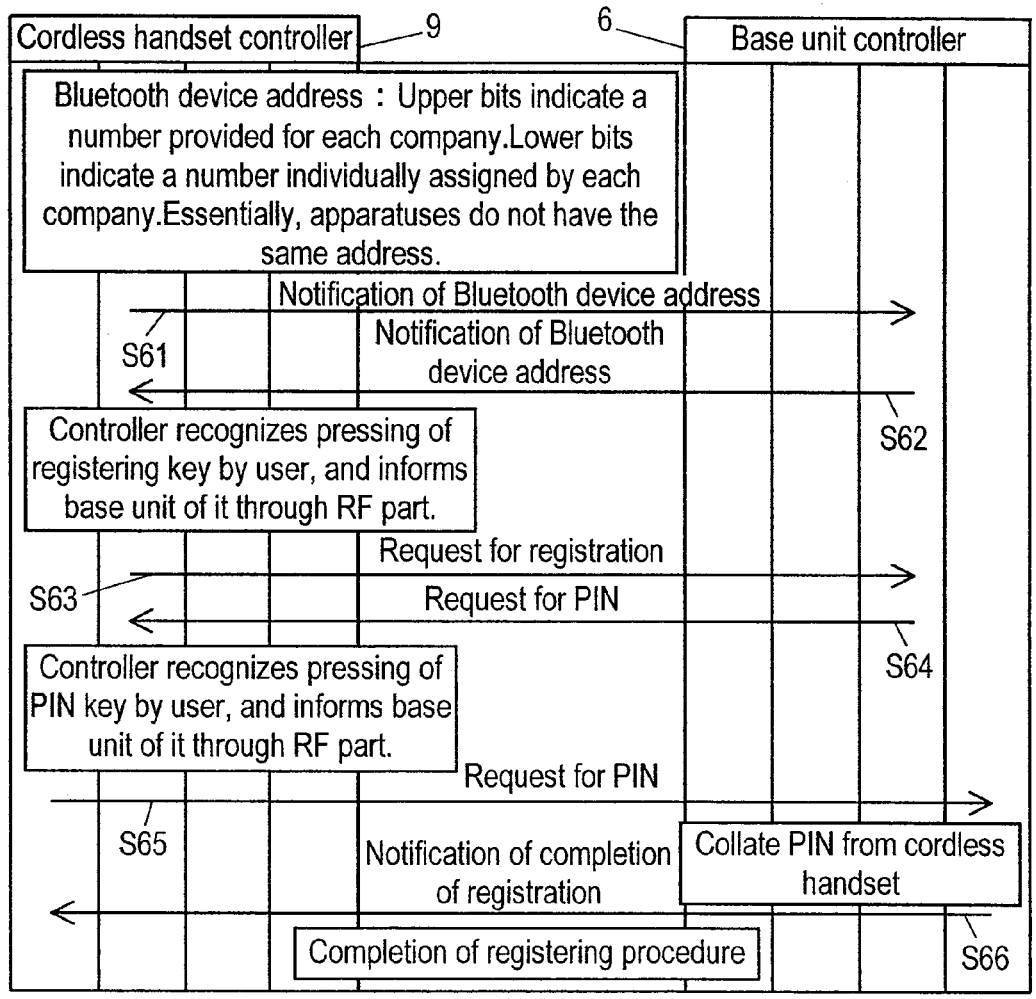
FIG. 12A is a sequence diagram showing a sequence operation between a base unit controller and a cordless handset controller in registering the cordless handset in accordance with an exemplary embodiment 2 of the present invention.
Figure 12B:
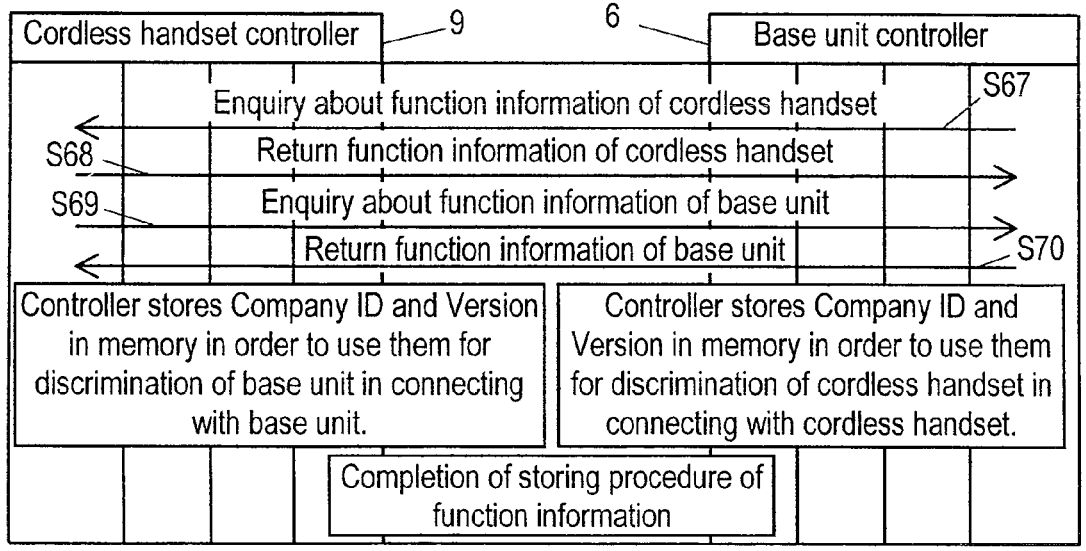
FIG. 12B is a sequence diagram showing a function information storing procedure in accordance with the exemplary embodiment 2.
Figure 13A:
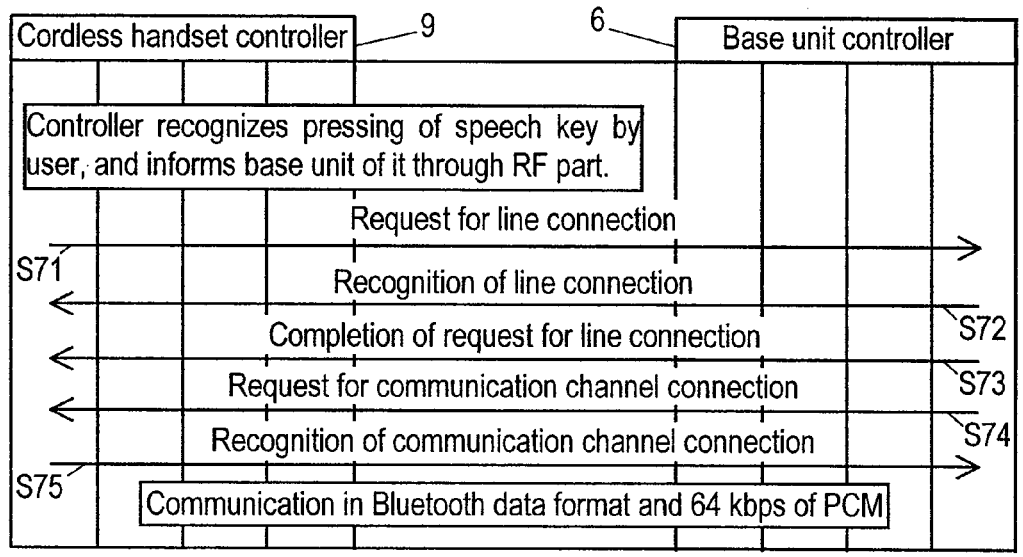
FIG. 13A is a sequence diagram showing a sequence operation between the base unit controller and the cordless handset controller in connecting a communication channel in accordance with the exemplary embodiment 2.
Figure 13B:
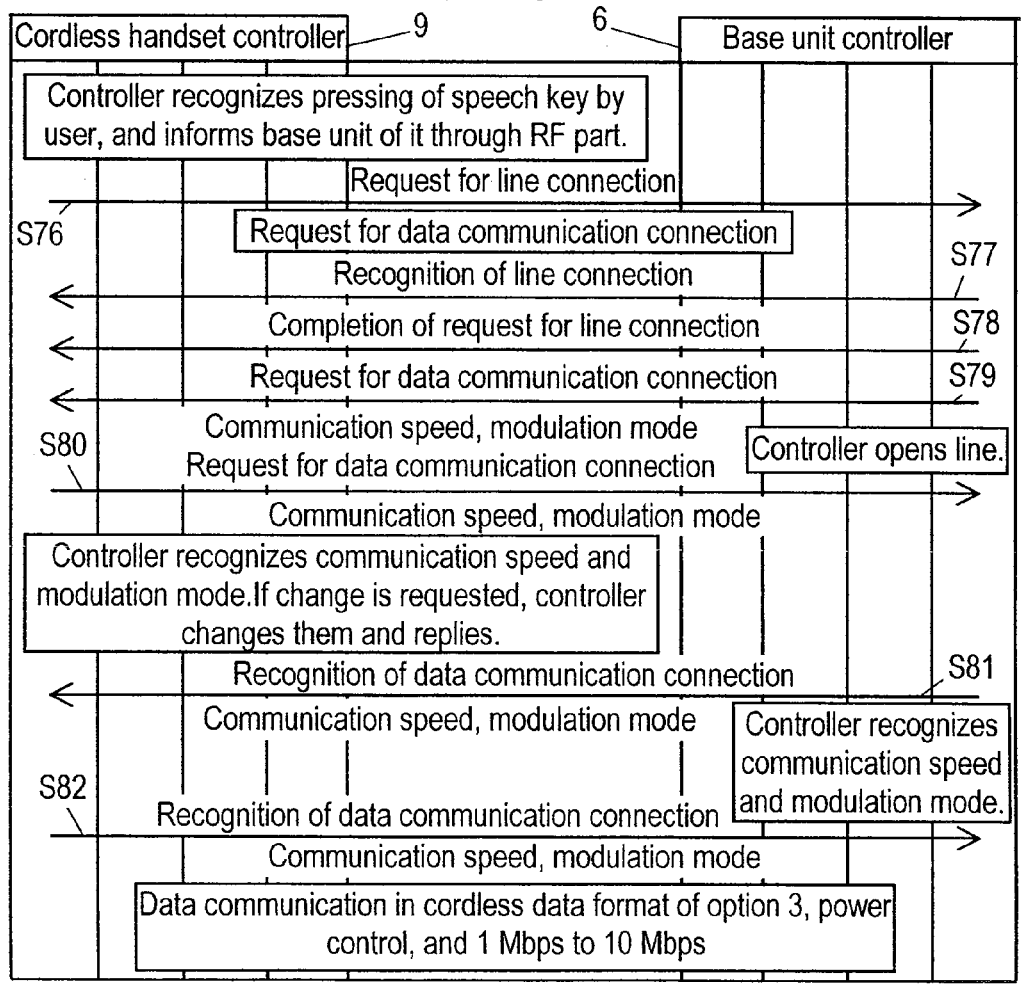
FIG. 13B is a sequence diagram showing a sequence operation between the base unit controller and the cordless handset controller in connecting a data communication channel in accordance with the exemplary embodiment 2.
Figure 14A:
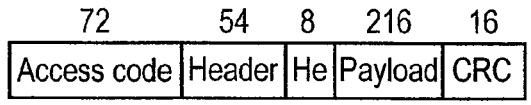
FIG. 14A is a format diagram of a data format (format of data signal) of the BT in accordance with the exemplary embodiment 2.
Figure 14B:
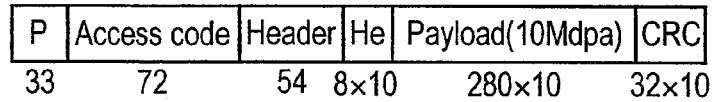
FIG. 14B is a format diagram of option 3 of data formats of the CDL in accordance with the exemplary embodiment 2.
Figure 15A:
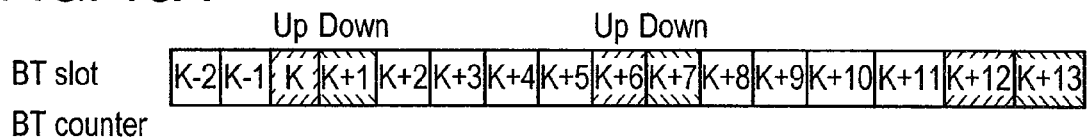
FIG. 15A is a time slot diagram showing assignment of a time slot in the BT mode in accordance with the exemplary embodiment 2.
Figure 15B:
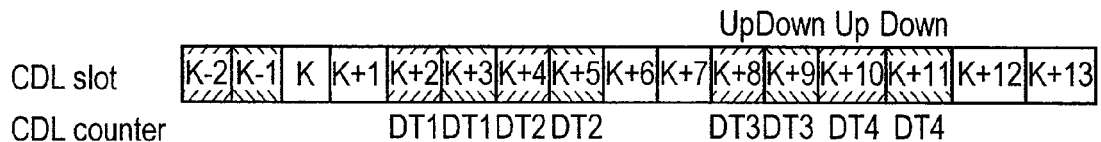
FIG. 15B is a time slot diagram showing assignment of the time slot in option 3 in the CDL mode in accordance with the exemplary embodiment 2.

Sequence operations between base unit controller 6 and cordless handset controller 9 which have such a structure are described with reference to FIG. 5A to FIG. 5C, FIG. 12A to FIG. 15B. FIG. 12A is a sequence diagram showing a sequence operation between base unit controller 6 and cordless handset controller 9 in registering the cordless handset. FIG. 12B is a sequence diagram showing a function information storing procedure. FIG. 13A is a sequence diagram showing a sequence operation between base unit controller 6 and cordless handset controller 9 in connecting a communication channel. FIG. 13B is a sequence diagram showing a sequence operation between base unit controller 6 and cordless handset controller 9 in connecting a data communication channel. FIG. 14A is a format diagram of a data format (format of a data signal) of the BT. FIG. 14B is a format diagram of a data format of option 3 in a company's own cordless phone (CDL) model. FIG. 15A is a time slot block diagram showing assignment of a time slot in the BT mode. FIG. 15B is a time slot block diagram showing assignment of the time slot (time slot for data transmission and reception) in option 3 of in the CDL mode.

A procedure of registering the cordless handset is firstly described with reference to FIG. 12A. Before the registering request from the cordless handset, the cordless handset and the base unit inform each other of respective unique identification numbers (peculiar Ids) (BT device addresses here) previously and peculiarly assigned to the cordless handset and the base unit (S61, S62).

In FIG. 12A, on detecting a pressed state of a registering key (not shown) of input unit 39, cordless handset controller 9 performs a registering request to the base unit (S63). Base unit controller 6, on receiving the registering request, requests a PIN of the cordless handset (S64). Cordless handset controller 9, on receiving the request for the PIN, informs the base unit of the PIN (S65). The base unit now finishes the registration of the cordless handset, and then base unit controller 6 informs the cordless handset of the completion of the registration (S66). The data format shown in FIG. 14A is used in steps S61 to S66. When the registering procedure finishes in step S66, base unit controller 6 checks whether or not upper bits of the BT device addresses indicate a predetermined number (number previously stored in storing unit 66). When they indicate the predetermined number, a function information recognizing procedure discussed below is performed. Upper bits of the BT device address indicate a number set for each company, and lower bits indicate a number set individually assigned by each company. A predetermined group manages the assignment of the company-by-company code in the upper bits, and assigns a number in response to an application from a company.

Now, a procedure of recognizing function information is described. In FIG. 12B, at the completion of the registering procedure, base unit controller 6 requests function information of the cordless handset (S67). The function information includes, for example, information showing whether or not a fast communication function is supported and information showing communication speed having the fast communication function. Cordless handset controller 9, on receiving the request, returns the function information previously stored in the cordless handset to the base unit (S68). The base unit registers the function information of the cordless handset together with the BT device address. Cordless handset controller 9 then requests function information of the base unit (S69). The function information includes, for example, information showing which communication function is supported and information showing communication speed when the data communication function is supported. Base unit controller 6, on receiving the request, returns the function information previously stored in the base unit to the cordless handset (S70). The cordless handset registers the function information of the base unit together with the BT device address. Now, the registration of the function information of the cordless handset is finished.

The data format shown in FIG. 5A is used in steps S61 to S70. The cordless handset and the base unit previously recognize mutual peculiar IDs, so that the function information can be registered together with the peculiar IDs in relation to each other.

Now, a procedure of connecting a line is described with reference to FIG. 5A to FIG. 5C, and FIG. 13A to FIG. 15B.

A case is described in which the base unit and the cordless handset do not have a specific BT device address or a case that a data communication function is not supported. Burst controller 7 of the base unit determines whether or not the cordless handset has the specific BT device address, based on received data shown from the cordless handset. The received data includes the BT device address of the cordless handset in a data region. This notification is performed before or during the request for the line connection.

As shown in FIG. 13A, on detecting the pressing of the speaking key (not shown) of input unit 39, cordless handset controller 9 requests the line connection of the base unit (S71). Base unit controller 6, on receiving the request for the line connection, transmits recognition data of the line connection to the cordless handset (S72), and informs the cordless handset of the completion of the request for the line connection (S73). Next, base unit controller 6 requests connection of communication channel (S74), cordless handset controller 9 returns the recognition of the communication channel connection to the base unit (S75), and then the line connection finishes. The data format shown in FIG. 13A is used in steps S71 to S75, and the data format shown in FIG. 13B is used in steps S76 or later.

A case is described in which the base unit and the cordless handset have a specific BT device address and the data communication function is supported.

As shown in FIG. 13B, on detecting the pressing of the speaking key (not shown) of input unit 39, cordless handset controller 9 requests line connection including data communication connection of the base unit (S76). Base unit controller 6, on receiving the request for the line connection, transmits recognition data of the line connection to the cordless handset (S77), and informs the cordless handset of the completion of the request for the line connection (S78). Next, base unit controller 6 specifies a communication speed and a moderation mode and requests the data communication connection (S79). Cordless handset controller 9 inversely specifies the communication speed and the moderation mode and requests the data communication connection (S80). On receiving the request for the data communication connection, base unit controller 6 returns recognition data of the data communication connection at the communication speed and the moderation mode (S81). Cordless handset controller 9, on receiving the recognition data, also returns the recognition data (S82).

The data format shown in FIG. 14A is used in steps S76 to S82, and the data format shown in FIG. 14B is used in steps S82 or later.

Figure 16:
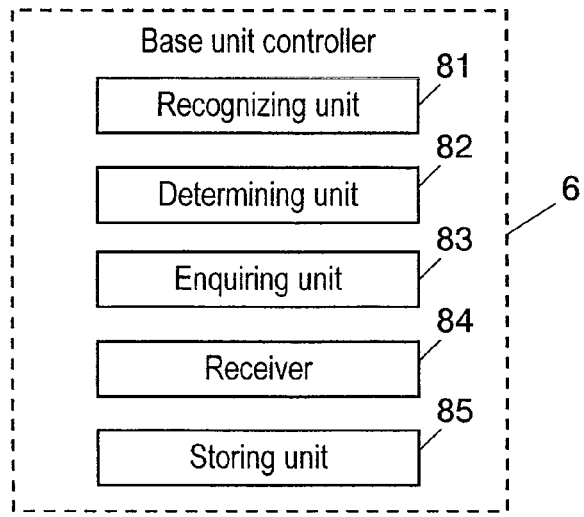
FIG. 16 is a function block diagram of function realizing units in the base unit controller in accordance with the exemplary embodiment 2.
Figure 17:
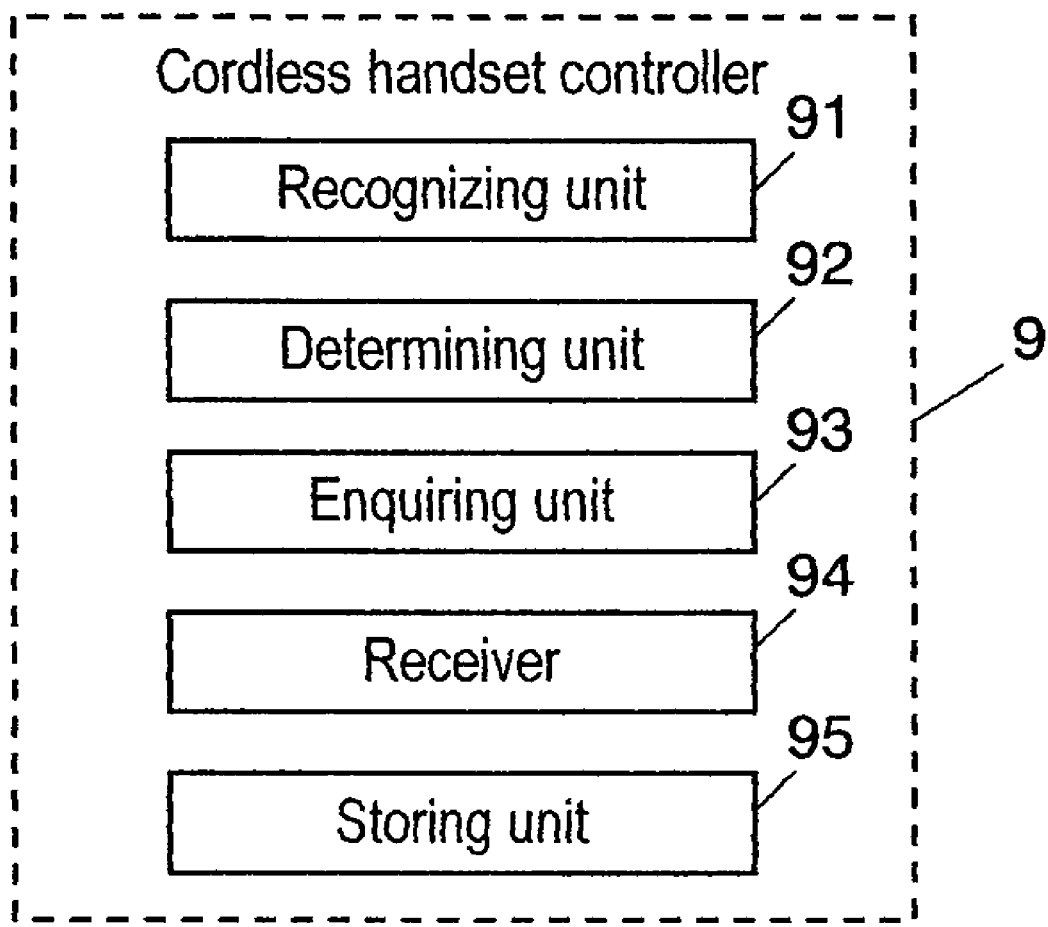
FIG. 17 is a function block diagram of function realizing units in the cordless handset controller in accordance with the exemplary embodiment 2.

FIG. 16 and FIG. 17 are function block diagrams of function realizing units in base unit controller 6 and cordless handset controller 9, respectively.

In FIG. 16, base unit controller 6 comprises the following function realizing units:
recognizing unit 81 for recognizing a BT device address (peculiar ID) of the cordless handset;
determining unit 82 for determining whether or not the peculiar ID is a specific ID and whether or not the cordless handset supports a specific function;
enquiring unit 83 for enquiring about the specific function supported by the cordless handset;
receiver 84 for receiving data from the cordless handset; and
storing unit 85 for storing the BT device address as the peculiar ID and the specific function supported by the cordless handset.

In FIG. 17, cordless handset controller 9 comprises the following function realizing units:
recognizing unit 91 for recognizing a BT device address (peculiar ID) of the base unit;
determining unit 92 for determining whether or not the peculiar ID is a specific ID and whether or not the base unit supports a specific function;
enquiring unit 93 for enquiring about the specific function supported by the base unit;
receiver 94 for receiving data from the base unit; and
storing unit 95 for storing the BT device address as the peculiar ID and the specific function supported by the cordless handset.

Figure 18:
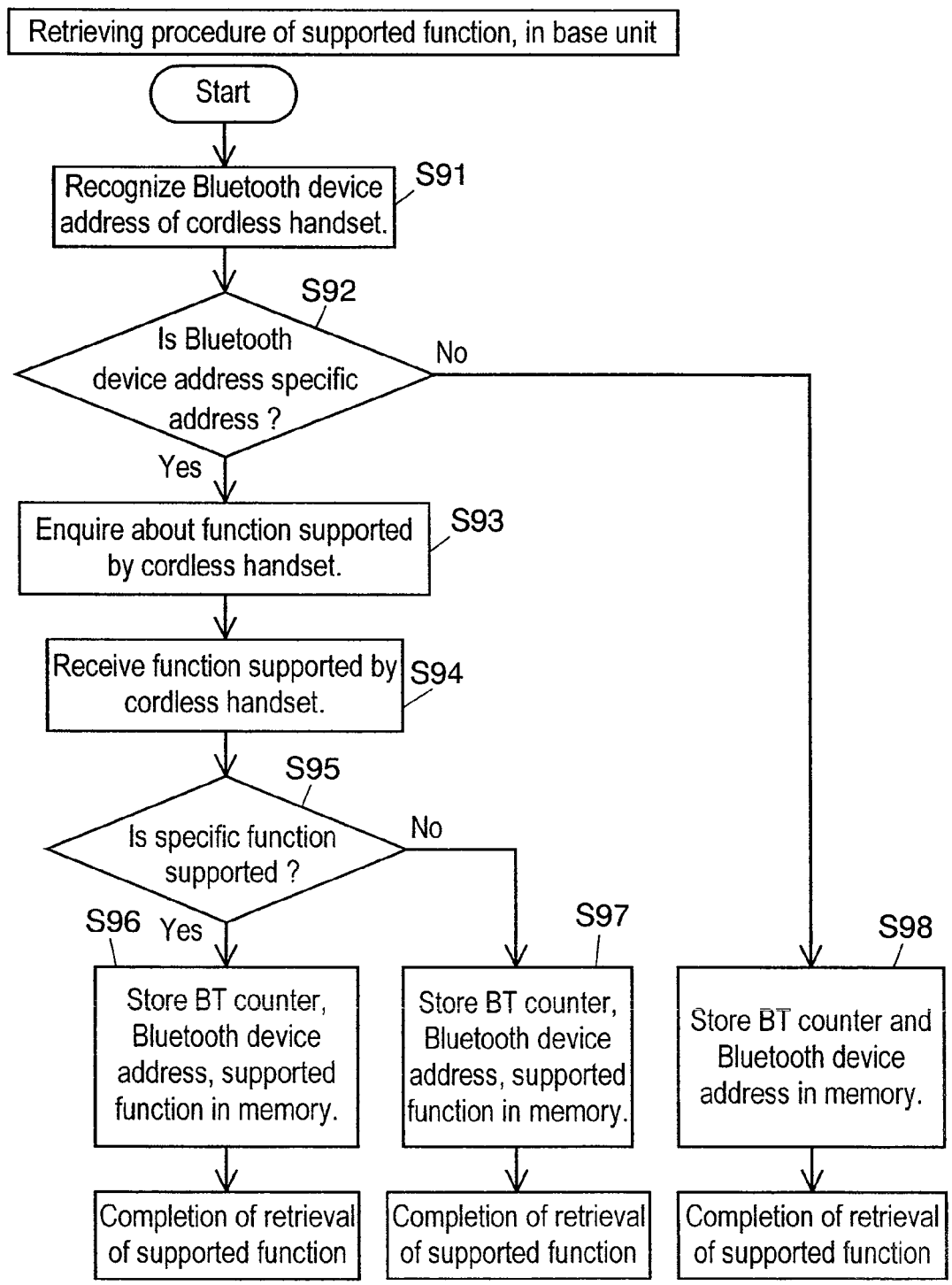
FIG. 18 is a flow chart of a function information storing procedure in the base unit in accordance with the exemplary embodiment 2.
Figure 19:
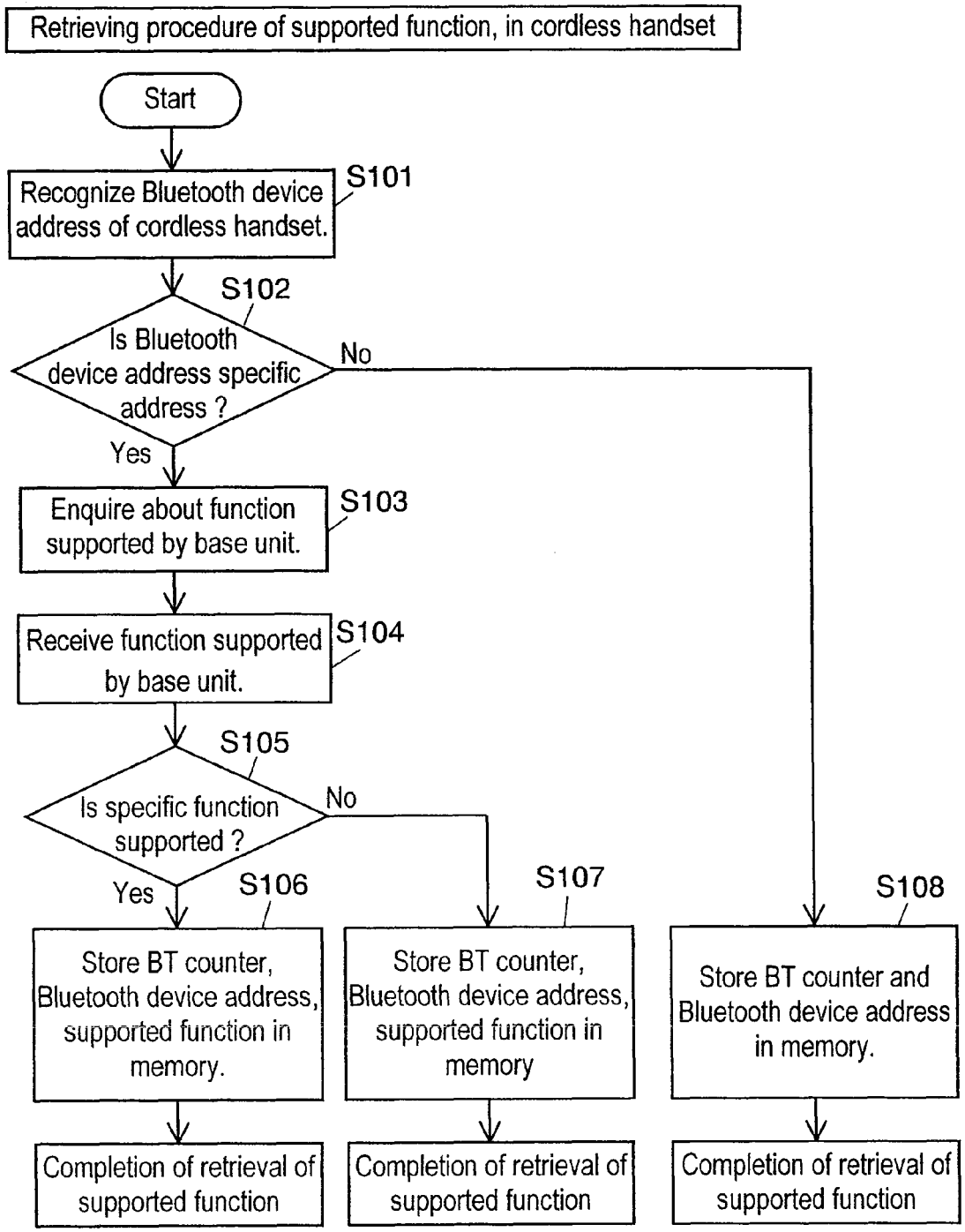
FIG. 19 is a flow chart of a function information storing procedure in the cordless handset in accordance with the exemplary embodiment 2.

Function information storing procedures in the base unit and the cordless handset that have such a structure are described with reference to FIG. 18 and FIG. 19, respectively. FIG. 18 is a flow chart of the function information storing procedure in the base unit. FIG. 19 is a flow chart of the function information storing procedure in the cordless handset. The function information includes information showing possibility of data communication and information showing a communication speed in the data communication.

The function information storing procedure in the base unit is firstly described with reference to FIG. 18. In FIG. 18, recognizing unit 81 recognizes a BT device address (peculiar ID) of the cordless handset (S91). The function information storing procedure in the base unit is performed after the completion of the registering procedure shown in FIG. 12A. At this time, the base unit controller recognizes the BT device address of the cordless handset after the registering procedure.

Determining unit 82 determines whether or not the BT device address is a specific address based on whether or not a predetermined part of the BT device address includes a predetermined code (S92). When the BT device address is determined to be the specific address, enquiring unit 83 enquires about a function supported by the cordless handset (S93). Receiver 84 receives the specific function supported by the cordless handset (S94). Then, determining unit 82 determines whether or not the specific function is supported (S95).

When it is determined that the specific function is supported in step S95, storing unit 85 stores in RAM 34 the BT device address and the supported function together with the number of a Bluetooth (BT) counter (S96). When it is determined that the specific function is not supported in step S95, storing unit 85 also stores in RAM 34 the BT device address and the supported function together with the number of the BT counter (S97).

When the BT device address is determined not to be the specific address in step S92, storing unit 85 stores in RAM 34 the BT device address together with the number of the BT counter (S98).

The function information storing procedure in the cordless handset is described with reference to FIG. 19.

In FIG. 19, recognizing unit 91 recognizes a BT device address (peculiar ID) of the base unit (S101). The function information storing procedure in the cordless handset is performed after the completion of the registering procedure shown in FIG. 12A. At this time, the cordless handset controller 9 recognizes the BT device address of the base unit after the registering procedure.

Determining unit 92 determines whether or not the BT device address is a specific address based on whether or not a predetermined part of the BT device address includes a predetermined code (S102). When the BT device address is determined to be the specific address, enquiring unit 93 enquires about a function supported by the base unit (S103).

Receiver 94 receives the specific function supported by the base unit (S104). Then, determining unit 92 determines whether or not the specific function is supported (S105).

When it is determined that the specific function is supported in step S105, storing unit 95 stores in RAM 34 the BT device address and the supported function together with the number of a BT counter (S106). When it is determined that the specific function is not supported in step S105, storing unit 95 also stores in RAM 34 the BT device address and the supported function together with the number of the BT counter (S107).

When the BT device address is determined not to be the specific address in step S102, storing unit 95 stores in RAM 34 the BT device address together with the number of the BT counter (S108).

As discussed above, a radio communication apparatus of the present embodiment transmits and receives signals in data formats in a plurality of radio communication standards, and has the following structure:

(1) a radio unit for transmitting and receiving signals in the data formats in the plurality of radio communication standards;

(2) RAM 34 for registering a peculiar ID of a counter radio apparatus on the other end of the line in registering the counter radio apparatus; and (3) base unit controller 6 for discriminating a communication mode based on the peculiar ID and performing a process in response to the discrimination result.

Base unit controller 6 selects a radio signal (for example, data format) to be communicated in response to the peculiar ID. For example, base unit controller 6 selects a radio signal corresponding to a company's own cordless phone mode when the peculiar ID is a specific ID, and selects a radio signal corresponding to the Bluetooth (BT) when the peculiar ID is not the specific ID. Such a structure allows selection of a radio communication signal corresponding to each state.

Base unit controller 6 determines whether or not a predetermined part of the peculiar ID includes a predetermined code and whether or not a specific communication function is supported. Base unit controller 6 performs a process in response to the determination result. Therefore, when the predetermined part of the peculiar ID includes the predetermined code and the specific communication function is supported, base unit controller 6 can communicate signals using the specific communication function. When the specific communication function provides fast data communication, base unit controller 6 can transmit data at a high speed.

When the specific communication function is fast data communication of 1 Mbps to 10 Mbps, base unit controller 6 can transmit data at a high speed in a range from 1 Mbps to 10 Mbps.

Base unit controller 6 comprises the following function realizing units:

(4) recognizing unit 81 for recognizing the peculiar ID of a counter radio apparatus on the other end of the line;

(5) determining unit 82 for determining whether or not the predetermined part includes the predetermined code and whether or not the counter radio apparatus supports the specific function; and (6) storing unit 85 for storing the peculiar ID and the specific function when the peculiar ID is the specific ID and the counter radio apparatus supports the specific function. The base unit can thus certainly perform communication with a quality corresponding to the peculiar ID of the counter radio apparatus.

The invention claimed is:

1. A communication method of a base station radio apparatus for communicating with a mobile radio apparatus, the communication method comprising: registering the mobile radio apparatus with the base station radio apparatus by: a) establishing communication between the base station radio apparatus and the mobile radio apparatus using a first communication mode implementing a first data format; b) transmitting identifying information and function information from the mobile radio apparatus to the base station radio apparatus, the identifying information identifying the mobile radio apparatus, and the function information indicating whether or not the mobile radio apparatus supports a second communication mode implementing a second data format; and c) storing and associating in the base station radio apparatus, both the identifying information of the mobile radio apparatus and the respective function information of the mobile radio apparatus; the base station radio apparatus identifying and communicating with the mobile radio apparatus after registration steps a-c by: d) receiving, by the base station radio apparatus, the identifying information of the mobile radio apparatus by using the first communication mode; e) selecting, by the base station radio apparatus, the second communication mode based on the stored function information associated with the identifying information when: the identifying information received in said receiving step d) and the identifying information stored in said storing step c) are identical, and the stored function information indicates that the mobile radio apparatus supports the second communication mode; f) selecting, by the base station radio apparatus, the first communication mode when: the identifying information received in said receiving step d) and the identifying information stored in said storing step c) are identical, and the stored function information indicates that the mobile radio apparatus does not support the second communication mode, or the identifying information received in said receiving step d) and the identifying information stored in said storing step c) are different; and g) communicating, between the base station radio apparatus and the mobile radio apparatus using the selected communication mode.

2. The communication method according to claim 1, wherein the identifying information includes company identifying information, the company identifying information being information for identifying a radio apparatus manufacturing company.

3. The communication method according to claim 1, wherein the plurality of communication modes include a communication mode of Bluetooth standard.

4. The communication method according to claim 3, wherein the second communication mode in said registration is the communication mode of Bluetooth standard.

5. The communication method according to claim 1, wherein the function information includes at least one of information regarding a communication speed, information regarding a transmission power of the radio communication apparatus or apparatus version information.

6. The communication method according to claim 5, wherein the information regarding communication speed is information for distinguishing a first data format for performing only error detection and a second data format for performing the error detection and error correction.

7. The communication method according to claim 1, wherein a sound error handling process is executed on sound data communicated between the radio apparatuses in step g).

8. The communication method of claim 1, including h) communicating with the mobile radio apparatus using the first communication mode when the selected communication mode is the first communication mode, or using the second communication mode when the selected communication mode is the second communication mode.

9. A base station radio apparatus for communicating with a mobile radio apparatus using a first communication mode implementing a first data format or communicating with the mobile radio apparatus using a second communication mode implementing a second data format, the radio apparatus communicating with the mobile radio apparatus by a method comprising: registering the mobile radio apparatus with the base station radio apparatus by: a) establishing communication between the base station radio apparatus and the mobile radio apparatus using a first communication mode implementing a first data format; b) transmitting identifying information and function information from the mobile radio apparatus to the base station radio apparatus, the identifying information identifying the mobile radio apparatus, and the function information indicating whether or not the mobile radio apparatus supports a second communication mode implementing a second data format; and c) storing and associating in the base station radio apparatus, both the identifying information of the mobile radio apparatus and the respective function information of the mobile radio apparatus; the base station radio apparatus identifying and communicating with the mobile radio apparatus after registration steps a-c by: d) receiving, by the base station radio apparatus, the identifying information of the mobile radio apparatus by using the first communication mode; e) selecting, by the base station radio apparatus, the second communication mode based on the stored function information associated with the identifying information when: the identifying information received in said receiving step d) and the identifying information stored in said storing step c) are identical, and the stored function information indicates that the mobile radio apparatus supports the second communication mode; f) selecting, by the base station radio apparatus, the first communication mode when: the identifying information received in said receiving step d) and the identifying information stored in said storing step c) are identical, and the stored function information indicates that the mobile radio apparatus does not support the second communication mode, or the identifying information received in said receiving step d) and the identifying information stored in said storing step c) are different; and g) communicating, between the base station radio apparatus and the mobile radio apparatus using the selected communication mode.

* * * * *